United States Patent
Yakabe et al.

(10) Patent No.: US 12,306,446 B2
(45) Date of Patent: May 20, 2025

(54) FERRULE AND OPTICAL CONNECTOR

(71) Applicants: SUMITOMO ELECTRIC INDUSTRIES, LTD., Osaka (JP); NIPPON TSUSHIN DENZAI CO., LTD., Komaki (JP)

(72) Inventors: Sho Yakabe, Osaka (JP); Yuto Fujihara, Osaka (JP); Dai Sasaki, Osaka (JP); Motoyoshi Kimura, Komaki (JP); Manabu Izaki, Komaki (JP)

(73) Assignees: SUMITOMO ELECTRIC INDUSTRIES, LTD., Osaka (JP); NIPPON TSUSHIN DENZAI CO., LTD., Komaki (JP)

( * ) Notice: Subject to any disclaimer, the term of this patent is extended or adjusted under 35 U.S.C. 154(b) by 200 days.

(21) Appl. No.: 18/015,687

(22) PCT Filed: Sep. 7, 2021

(86) PCT No.: PCT/JP2021/032822
§ 371 (c)(1),
(2) Date: Jan. 11, 2023

(87) PCT Pub. No.: WO2022/065023
PCT Pub. Date: Mar. 31, 2022

(65) Prior Publication Data
US 2023/0251434 A1    Aug. 10, 2023

(30) Foreign Application Priority Data
Sep. 25, 2020  (JP) .................. 2020-161209

(51) Int. Cl.
G02B 6/38    (2006.01)

(52) U.S. Cl.
CPC ......... *G02B 6/3885* (2013.01); *G02B 6/3838* (2013.01); *G02B 6/3839* (2013.01); *G02B 6/3853* (2013.01); *G02B 6/3881* (2013.01)

(58) Field of Classification Search
CPC .. G02B 6/3838; G02B 6/3839; G02B 6/3853; G02B 6/3881; G02B 6/3885
See application file for complete search history.

(56) References Cited

U.S. PATENT DOCUMENTS 6,062,740 A     5/2000  Ohtsuka et al.
10,768,380 B2 * 9/2020  Nakama ............... G02B 6/4239
(Continued)

FOREIGN PATENT DOCUMENTS

JP  H11-133269 A    5/1999
JP  2001-324650 A   11/2001
(Continued)

*Primary Examiner* — Ryan A Lepisto
(74) *Attorney, Agent, or Firm* — Oliff PLC

(57) ABSTRACT

A ferrule includes: a tip surface; an opening portion provided on a side opposite to the tip surface in a first direction intersecting the tip surface; a plurality of fiber grooves extending along the first direction and arranged along a second direction intersecting the first direction between the tip surface and the opening portion, the plurality of fiber grooves being capable of respectively supporting a plurality of optical fibers; and a plurality of lenses respectively disposed on extension lines of the plurality of fiber grooves. The fiber groove has a first fiber groove portion for positioning the optical fiber with respect to the lens and a second fiber groove portion for introducing the optical fiber into the first fiber groove portion. The first fiber groove portion is disposed closer to the lens than the second fiber groove portion in the first direction.

18 Claims, 17 Drawing Sheets

(56) References Cited

U.S. PATENT DOCUMENTS

| | | |
|---|---|---|
| 2004/0161205 A1 | 8/2004 | Hengelmolen et al. |
| 2016/0216455 A1* | 7/2016 | Huang ................ G02B 6/3885 |
| 2018/0239092 A1 | 8/2018 | Childers et al. |
| 2020/0371298 A1 | 11/2020 | Nakama et al. |

FOREIGN PATENT DOCUMENTS

| | | |
|---|---|---|
| JP | 2004-4333 A | 1/2004 |
| JP | 2004-246112 A | 9/2004 |
| JP | 2009-193030 A | 8/2009 |
| JP | 2015-203858 A | 11/2015 |
| JP | 2019-90974 A | 6/2019 |

* cited by examiner

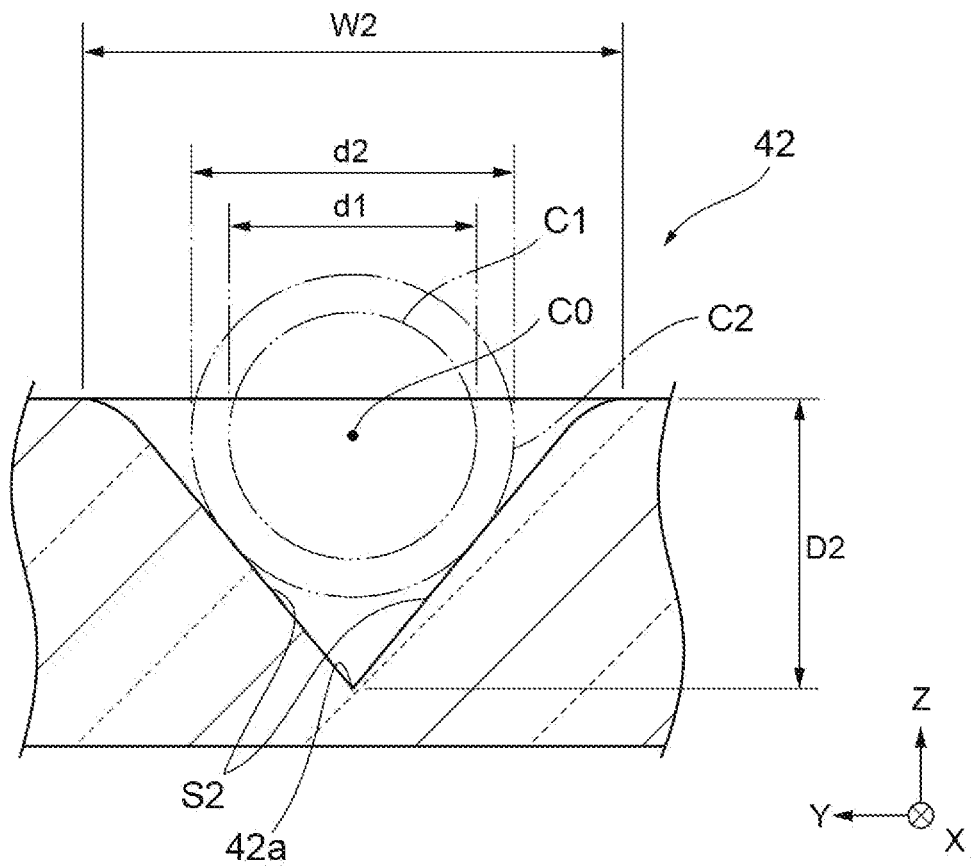

FERRULE AND OPTICAL CONNECTOR

TECHNICAL FIELD

The present disclosure relates to a ferrule and an optical connector.

This application is based upon and claims the benefit of priority from Japanese Application No. 2020-161209 filed on Sep. 25, 2020, and the entire contents of which are incorporated herein by reference.

BACKGROUND ART

An optical connector known in the related art includes a ferrule having a plurality of lenses at the tip portion thereof and a plurality of optical fibers inserted in the ferrule (see, for example, Patent Literature 1). In such an optical connector, a plurality of fiber grooves respectively supporting the plurality of optical fibers are provided at, for example, positions respectively corresponding to the plurality of lenses. In assembling the optical fibers to the ferrule, the optical fibers are inserted into the ferrule from an opening portion formed at the rear end of the ferrule, and the optical fibers are respectively disposed in the fiber grooves. By the fiber grooves supporting the optical fibers, the optical fibers are positioned with high accuracy with respect to the lens.

CITATION LIST

Patent Literature

Patent Literature 1: Japanese Unexamined Patent Publication No. 2019-090974

SUMMARY OF INVENTION

A ferrule according to one embodiment of the present disclosure includes: a tip surface; an opening portion provided on a side opposite to the tip surface in a first direction intersecting the tip surface; a plurality of fiber grooves extending along the first direction and arranged along a second direction intersecting the first direction between the tip surface and the opening portion, the plurality of fiber grooves being capable of respectively supporting a plurality of optical fibers; and a plurality of lenses respectively disposed on extension lines of the plurality of fiber grooves. The fiber groove has a first fiber groove portion for positioning the optical fiber with respect to the lens and a second fiber groove portion for introducing the optical fiber into the first fiber groove portion. The first fiber groove portion is disposed closer to the lens than the second fiber groove portion in the first direction.

An optical connector according to one embodiment of the present disclosure includes: the ferrule described above; and the plurality of optical fibers respectively supported by the plurality of fiber grooves and respectively disposed on optical axes of the plurality of lenses.

BRIEF DESCRIPTION OF DRAWINGS

FIG. 7B is a cross-sectional view illustrating a straight portion of a second fiber groove portion.

DESCRIPTION OF EMBODIMENTS

Figure 1:
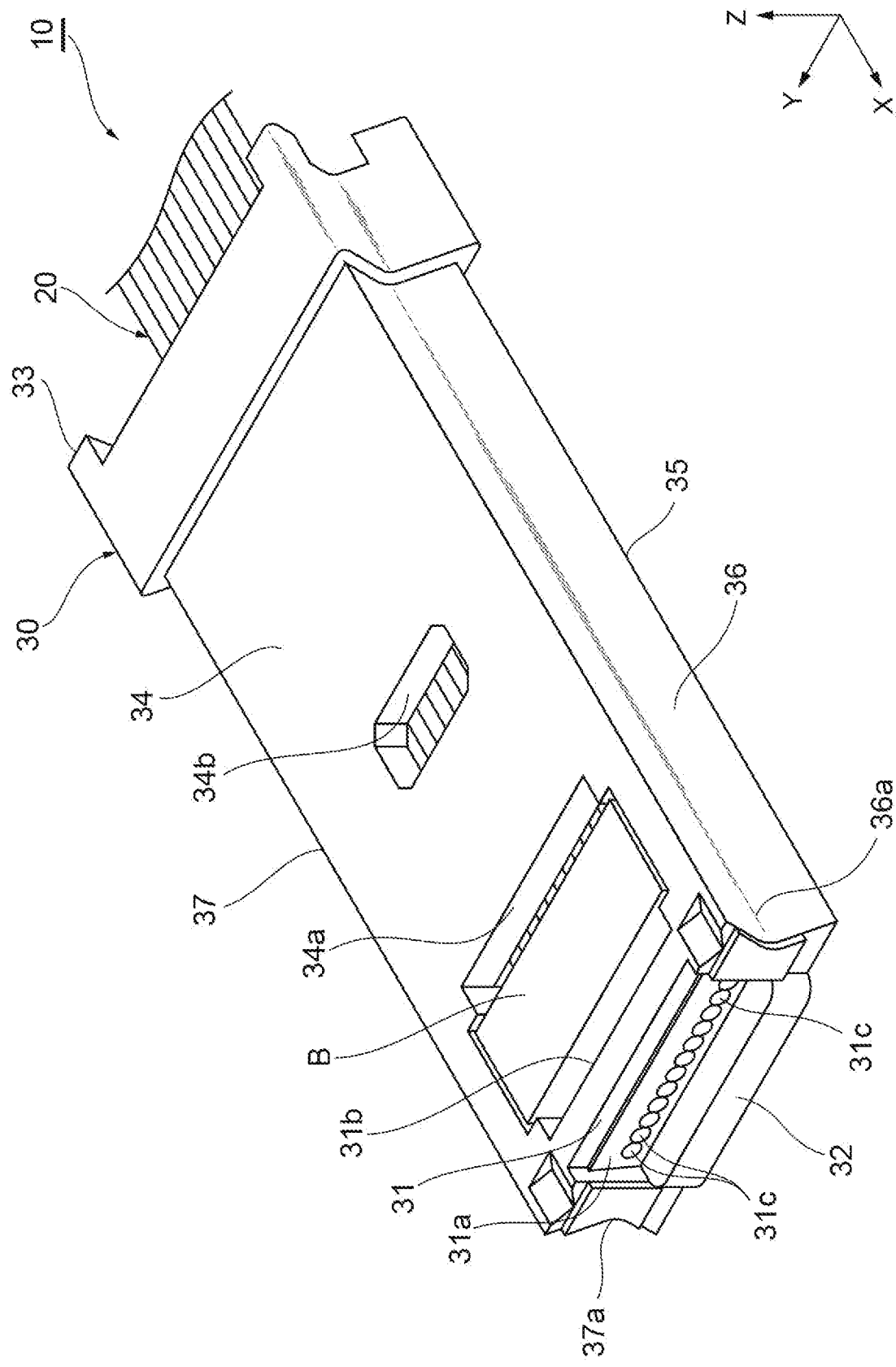
FIG. 1 is a perspective view illustrating an optical connector according to one embodiment.

Problem to be Solved by Present Disclosure

In the optical connector described in Patent Literature 1, in a case where it is difficult to see the fiber grooves from the opening portion at the rear end of the ferrule, it may be difficult to reliably dispose the optical fibers inserted in the ferrule into the fiber grooves in assembling the optical fibers to the ferrule. In such a case, a problem may arise in workability in assembling the optical fibers to the ferrule, examples of which include collision of the optical fibers inserted in the ferrule with the wall portion between the fiber grooves.

Effects of Present Disclosure

With the ferrule and the optical connector according to the present disclosure, workability can be improved during optical fiber assembly.

Description of Embodiments of Present Disclosure

The content of an embodiment of the present disclosure will be listed and described first. A ferrule according to one embodiment of the present disclosure includes: a tip surface; an opening portion provided on a side opposite to the tip surface in a first direction intersecting the tip surface; a plurality of fiber grooves extending along the first direction and arranged along a second direction intersecting the first direction between the tip surface and the opening portion, the plurality of fiber grooves being capable of respectively supporting a plurality of optical fibers; and a plurality of lenses respectively disposed on extension lines of the plurality of fiber grooves. The fiber groove has a first fiber groove portion for positioning the optical fiber with respect to the lens and a second fiber groove portion for introducing the optical fiber into the first fiber groove portion. The first fiber groove portion is disposed closer to the lens than the second fiber groove portion in the first direction.

The fiber groove of this ferrule has the second fiber groove portion for introducing the optical fiber into the first fiber groove portion in addition to the first fiber groove portion for positioning the optical fiber with respect to the lens. Further, the first fiber groove portion is disposed closer to the lens than the second fiber groove portion in the first direction. Therefore, when the optical fiber is inserted into the ferrule from the opening portion, the optical fiber is introduced into the first fiber groove portion by the second fiber groove portion and the optical fiber is positioned with respect to the lens in the first fiber groove portion. In this manner, by the second fiber groove portion being present to introduce the optical fiber into the first fiber groove portion, it is possible to reduce collision of the optical fiber with the wall portion between the fiber grooves and reliably dispose the optical fiber in the first fiber groove portion in inserting the optical fiber into the ferrule. Therefore, according to the ferrule described above, workability can be improved in assembling the optical fiber.

Each of the first fiber groove portion and the second fiber groove portion may be V-shaped in a cross section perpendicular to the first direction. In this case, the position of the optical fiber with respect to the lens can be positioned more accurately.

An opening width of the second fiber groove portion may be larger than an opening width of the first fiber groove portion in a cross section perpendicular to the first direction. In this case, the misalignment tolerance of the optical fiber supported by the second fiber groove portion with respect to the lens can be ensured to be larger than the misalignment tolerance of the optical fiber supported by the first fiber groove portion with respect to the lens. As a result, when the optical fiber is inserted into the ferrule, it is possible to highly accurately determine the position of the optical fiber with respect to the lens in the first fiber groove portion after determining the approximate position of the optical fiber with respect to the lens in the second fiber groove portion.

A diameter of a virtual circle centered on an optical axis of the lens and inscribed in the second fiber groove portion may be larger than a diameter of a virtual circle centered on the optical axis of the lens and inscribed in the first fiber groove portion in a cross section perpendicular to the first direction. In this case, the misalignment tolerance with respect to the lens of the optical fiber supported by the second fiber groove portion can be ensured to be larger than the misalignment tolerance with respect to the lens of the optical fiber supported by the first fiber groove portion. As a result, when the optical fiber is inserted into the ferrule, it is possible to highly accurately determine the position of the optical fiber with respect to the lens in the first fiber groove portion after determining the approximate position of the optical fiber with respect to the lens in the second fiber groove portion.

The second fiber groove portion may include: a straight portion where the diameter of the virtual circle centered on the optical axis of the lens and inscribed in the second fiber groove portion is constant at each position along the first direction; and a tapered portion disposed on a side opposite to the first fiber groove portion with respect to the straight portion in the first direction and inclined such that the diameter of the virtual circle centered on the optical axis of the lens and inscribed in the second fiber groove portion increases as a distance from the straight portion increases.

By the tapered portion as described above being present, the optical fiber inserted from the opening portion into the ferrule can be reliably guided into the straight portion. Further, by the straight portion being present, the posture of the optical fiber can be stabilized to a state along the first direction and the optical fiber can be smoothly introduced into the first fiber groove portion with the posture stabilized. Therefore, according to the configuration described above, the optical fiber can be reliably and smoothly introduced into the first fiber groove portion.

A total length of the second fiber groove portion in the first direction may be equal to or greater than a total length of the first fiber groove portion in the first direction. In this case, the posture of the optical fiber can be more reliably stabilized in the second fiber groove portion.

The second fiber groove portion may be disposed at a predetermined interval from the first fiber groove portion in the first direction. In this case, the first fiber groove portion can be manufactured with high accuracy by forming the first fiber groove portion separately from the second fiber groove portion.

The ferrule may further include an upper surface disposed at a position facing the plurality of fiber grooves in a third direction intersecting the first direction and the second direction. The upper surface may have a window portion opening in a region facing the first fiber groove portion in the third direction. The first fiber groove portion may be fitted inside the window portion when viewed from the third direction. In this case, the window portion can be used not only as an injection window portion for injecting an adhesive into the ferrule but also for alignment work in introducing the optical fiber into the first fiber groove portion. As a result, workability can be further improved in assembling the optical fiber.

The ferrule described above may further include a pair of side surfaces disposed at positions facing each other with the plurality of fiber grooves interposed therebetween in the second direction. The pair of side surfaces may be respectively provided with guide portions guiding insertion into an adapter along the first direction. In this case, the respective guide portions of the pair of side surfaces can be used for positioning the ferrule with respect to the adapter. As a result, the ferrule can be positioned with respect to the adapter without using an expensive guide pin.

An optical connector according to one embodiment of the present disclosure includes: the ferrule according to any of the above; and the plurality of optical fibers respectively supported by the plurality of fiber grooves and respectively disposed on optical axes of the plurality of lenses. Since this optical connector includes the ferrule according to any of the above, workability can be improved in assembling the optical fiber to the ferrule as described above.

In the optical connector described above, the optical fiber may be fixed to the first fiber groove portion by an adhesive. In this case, the position of the optical fiber with respect to the lens is fixed by the adhesive, and thus the positioning of the optical fiber with respect to the lens can be performed more reliably.

In the optical connector described above, the ferrule may include an upper surface disposed at a position facing the plurality of fiber grooves in a third direction intersecting the first direction and the second direction, and the upper surface may have a window portion opening in a region facing the first fiber groove portion in the third direction. A lid portion disposed above the first fiber groove portion via the optical fiber may be provided inside the window portion. In this case, by the lid portion pressing the optical fiber against the first fiber groove portion, the optical fiber can be positioned with respect to the lens more reliably.

Details of Embodiment of Present Disclosure

Hereinafter, an embodiment of the present disclosure will be described in detail with reference to the accompanying drawings. In the following description, the same reference numerals will be used for the same elements or elements having the same functions with redundant description omitted.

Figure 2:
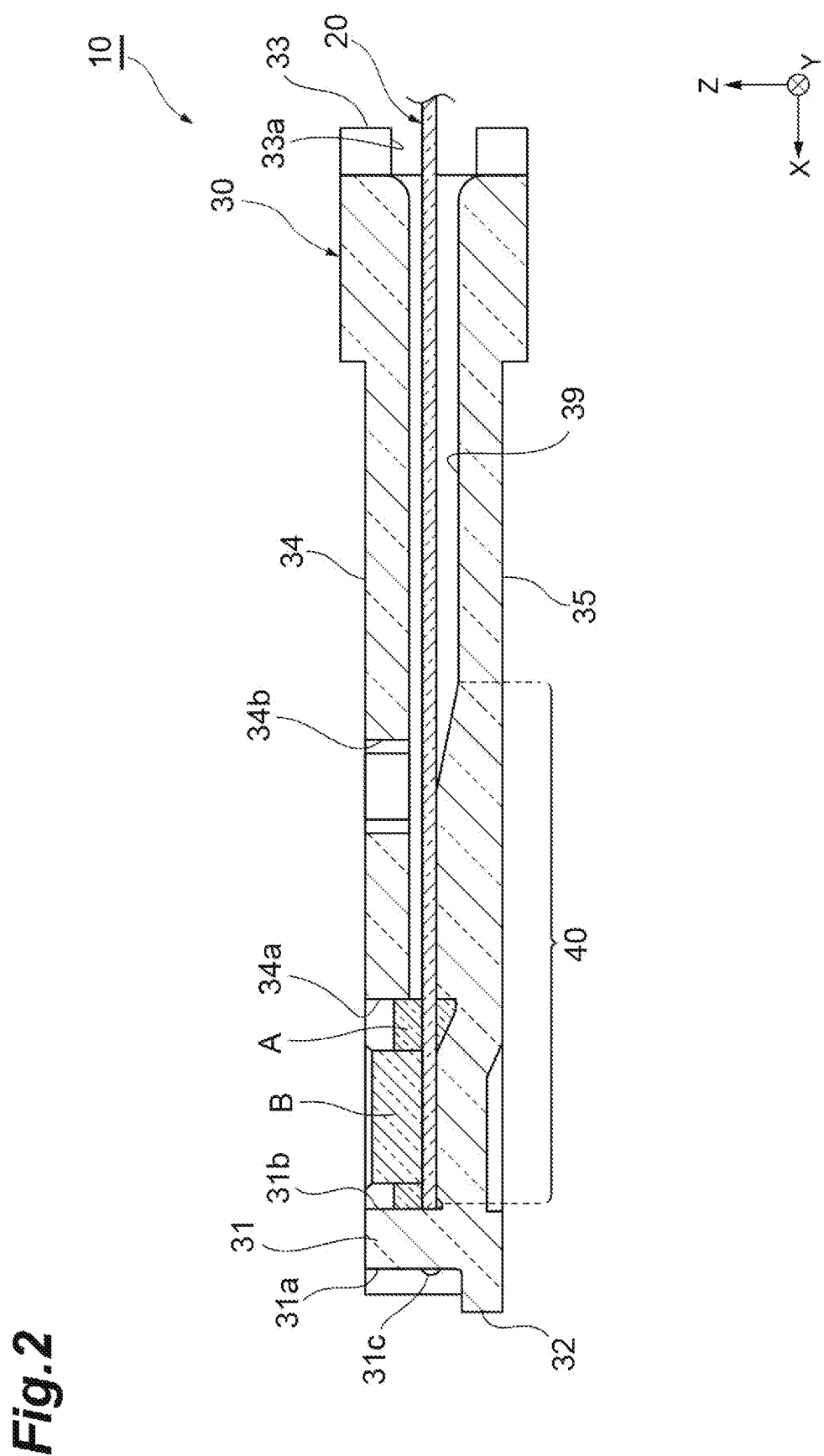
FIG. 2 is a cross-sectional view illustrating the optical connector of FIG. 1.

FIG. 1 is a perspective view illustrating an optical connector 10 according to the present embodiment. FIG. 2 is a cross-sectional view illustrating the optical connector 10. In each drawing, an XYZ orthogonal coordinate system is illustrated for easy understanding. In the present embodiment, the longitudinal direction of the optical connector 10 is the X direction (first direction), the lateral direction of the optical connector 10 is the Y direction (second direction), and the height direction of the optical connector 10 is the Z direction (third direction). In the following description, for convenience of description, directions may be defined as "front" and "rear". The X direction that is from the optical connector 10 toward the mating optical connector 10 (see FIG. 10) is defined as "front" and the opposite direction is defined as "rear".

As illustrated in FIGS. 1 and 2, the optical connector 10 includes a plurality of (12 in the present embodiment) optical fibers 20 and a ferrule 30 where the front end portions of the plurality of optical fibers 20 are inserted. Each optical fiber 20 extends along the X direction and is arranged in a row along the Y direction. Each optical fiber 20 may be a multi-mode fiber (MIVIF) or a single-mode fiber (SMF). The number of optical fibers 20 is not limited to 12. For example, the number may be another number such as 4, 8, and 16.

The ferrule 30 holds the plurality of optical fibers 20. The ferrule 30 has, for example, a substantially rectangular parallelepiped appearance. The ferrule 30 has a lens portion 31 at the front end portion thereof. The ferrule 30 is, for example, configured integrally with the lens portion 31. In other words, the ferrule 30 is formed by being molded integrally with the lens portion 31. Therefore, the ferrule 30 is configured by the same material as the lens portion 31, that is, a light-transmitting material capable of configuring the lens portion 31. The ferrule 30 can be configured by, for example, polyphenylene sulfide (PPS), polyetherimide (PEI), polycarbonate (PC), polymethyl methacrylate (PMMA), polyethersulfone (PES), cycloolefin polymer (COP), or the like.

The lens portion 31 is provided in front of the plurality of optical fibers 20 and faces the plurality of optical fibers 20 in the X direction. The lens portion 31 has, for example, a plate shape along the YZ plane. The lens portion 31 includes a front end surface 31a positioned at the front end in the X direction, a rear end surface 31b positioned at the rear end in the X direction, and a plurality of lenses 31c provided on the front end surface 31a. The front end surface 31a and the rear end surface 31b are, for example, flat surfaces parallel to the YZ plane. The rear end surface 31b faces the plurality of optical fibers 20 in the X direction.

Each lens 31c is a convex lens protruding forward from the front end surface 31a. The lenses 31c are arranged in a row along the Y direction so as to respectively correspond to the positions of the optical fibers 20. The lenses 31c are respectively disposed on the optical axes of the optical fibers 20 and optically coupled to each of the optical fibers 20, respectively. For example, when viewed from the X direction, the optical axes of the lenses 31c coincide with the optical axes of each of the optical fibers 20, respectively. Light emitted from each optical fiber 20 is converted into parallel light (that is, collimated light) by each lens 31c and then enters the mating optical connector 10 (see FIG. 10). The optical axis of the optical fiber 20 and the optical axis of the lens 31c may be mutually misaligned so that reflected return light to the front end surface of the optical fiber 20 is suppressed. Likewise, for the purpose of suppressing reflected return light, the front end surface of the optical fiber 20 or the front end surface 31a of the lens portion 31 may be inclined by, for example, 8° with respect to the YZ plane.

The ferrule 30 has a front end surface 32 (tip surface) positioned at the front end in the X direction, a rear end surface 33 positioned at the rear end in the X direction, and four outside surfaces 34, 35, 36, and 37 connecting the front end surface 32 and the rear end surface 33 in the X direction. The front end surface 32 and the rear end surface 33 are, for example, along the YZ plane. The front end surface 32 is at a position slightly protruding forward beyond the front end surface 31a of the lens portion 31. The rear end surface 33 includes an opening portion 33a (see FIG. 2) collectively receiving the plurality of optical fibers 20. The opening portion 33a is a part of the rear end surface 33 that opens in the X direction.

The outside surface 34 and the outside surface 35 face each other in the Z direction and extend along the XY plane. The outside surface 34 faces one side in the Z direction and configures the upper surface of the ferrule 30. The outside surface 35 faces the other side in the Z direction and configures the lower surface of the ferrule 30. The outside surface 34 is at a position facing a plurality of fiber grooves 40 (described later) in the Z direction. The outside surface 34 is provided with two window portions 34a and 34b that open in the Z direction. The window portion 34a is disposed closer to the front end surface 32 than the window portion 34b in the X direction. The window portion 34a is, for example, disposed behind the lens portion 31. The width of the window portion 34a in the Y direction is equal to or greater than the overall width of the plurality of optical fibers 20 in the Y direction. The window portion 34b is provided at a position behind and separated at a predetermined distance from the window portion 34a. The width of the window portion 34b in the Y direction is, for example, narrower than the width of the window portion 34a in the Y direction. The number of window portions opening to the outside surface 34 is not limited to two and may be one or three or more.

The outside surface 36 and the outside surface 37 are disposed at positions facing each other in the Y direction and configure the pair of side surfaces of the ferrule 30. The outside surface 36 and the outside surface 37 are respectively provided with a V-groove 36a and a V-groove 37a (guide portions) for guiding insertion of the ferrule 30 into an adapter 50 (see FIG. 10) to be described later. The V-groove 36a and the V-groove 37a are, for example, disposed at positions mutually symmetrical with respect to the middle of the ferrule 30 in the Y direction. The V-groove 36a is recessed from the outside surface 36 to the inside of the ferrule 30 in the Y direction (that is, the side facing the outside surface 37 from the outside surface 36) and is open to the outside of the ferrule 30 in the Y direction (that is, the side opposite to the outside surface 37 with respect to the outside surface 36). The V-groove 36a is V-shaped in the YZ cross section, and the bottom portion of the V-groove 36a is, for example, rounded. The V-groove 36a linearly extends along the X direction on the outside surface 36. The V-groove 36a, for example, continuously extends along the X direction from the front end surface 32 to the rear end surface 33 on the outside surface 36. In other words, the V-groove 36a extends over the entire length of the ferrule 30 in the X direction.

The V-groove 37a is recessed from the outside surface 37 to the inside of the ferrule 30 in the Y direction and is open to the outside of the ferrule 30 in the Y direction. The V-groove 37a has, for example, the same shape as the V-groove 36a. The V-groove 37a linearly extends along the X direction on the outside surface 37. The V-groove 37a, for example, continuously extends along the X direction from the front end surface 32 to the rear end surface 33 on the outside surface 37. In other words, the V-groove 37a extends over the entire length of the ferrule 30 in the X direction.

As illustrated in FIG. 2, the ferrule 30 has an accommodation hole 39 accommodating the plurality of optical fibers 20 received from the opening portion 33a of the rear end surface 33 and the plurality of fiber grooves 40 respectively supporting the plurality of optical fibers 20 accommodated in the accommodation hole 39 in the ferrule 30. The accommodation hole 39 extends along the X direction from the opening portion 33a of the rear end surface 33 to the rear end surface 31b of the lens portion 31. The accommodation hole 39 communicates in the Z direction with the window portions 34a and 34b provided on the outside surface 34. The plurality of fiber grooves 40 extend along the X direction from the middle portion of the accommodation hole 39 in the X direction to the front end portion of the accommodation hole 39. The front ends of the plurality of fiber grooves 40 are at positions facing the window portion 34a in the Z direction. The rear ends of the plurality of fiber grooves 40 are at positions behind the window portion 34b. The plurality of fiber grooves 40 are arranged along the Y direction so as to respectively correspond to the plurality of lenses 31c. In other words, the plurality of lenses 31c are respectively disposed on extension lines of the plurality of fiber grooves 40. Accordingly, the plurality of lenses 31c respectively face the plurality of optical fibers 20 supported by the plurality of fiber grooves 40 in the X direction.

As illustrated in FIG. 2, an adhesive A injected from the window portion 34a is provided on the plurality of fiber grooves 40. The adhesive A is configured by, for example, a light-transmitting material. The optical fibers 20 are respectively fixed in the fiber grooves 40 by the adhesive A. Further, a lid portion B is provided inside the window portion 34a above the fiber grooves 40. The lid portion B is a plate-shaped member along the XY plane and is configured separately from the ferrule 30. The lid portion B is configured by, for example, a light-transmitting glass plate, resin, or the like. The lid portion B is placed on the optical fibers 20 respectively supported by the fiber grooves 40 and disposed so as to press the optical fibers 20 against the fiber grooves 40, respectively. As a result, the positions of the optical fibers 20 with respect to the fiber grooves 40 are respectively fixed. The lid portion B is, for example, disposed in the region that is inside the window portion 34a and faces a straight portion 41b (see FIG. 5) of a first fiber groove portion 41 (described later) in the Z direction, and the lid portion B is in contact with the straight portion 41b. Although the lid portion B in the example illustrated in FIG. 2 is disposed so as to fit inside the window portion 34a, a part of the lid portion B may protrude in the Z direction from the window portion 34a to the outside. In other words, a part of the lid portion B may protrude upward from the window portion 34a. The adhesive A may be in the gap between the lid portion B and each fiber groove 40 or may be in each fiber groove 40 (that is, the gap between each optical fiber 20 and each fiber groove 40).

Figure 3:
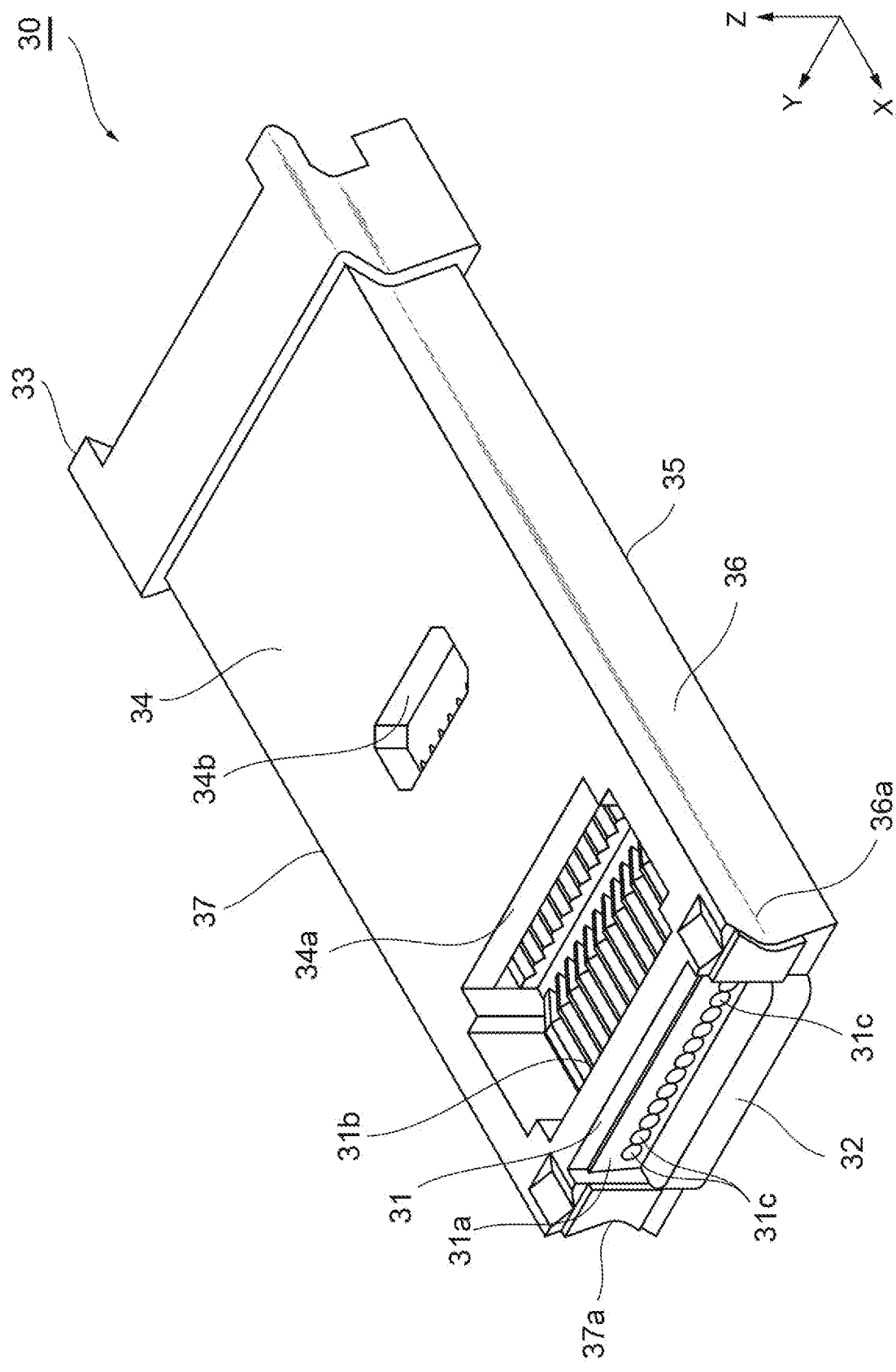
FIG. 3 is a perspective view illustrating a ferrule according to one embodiment.
Figure 4:
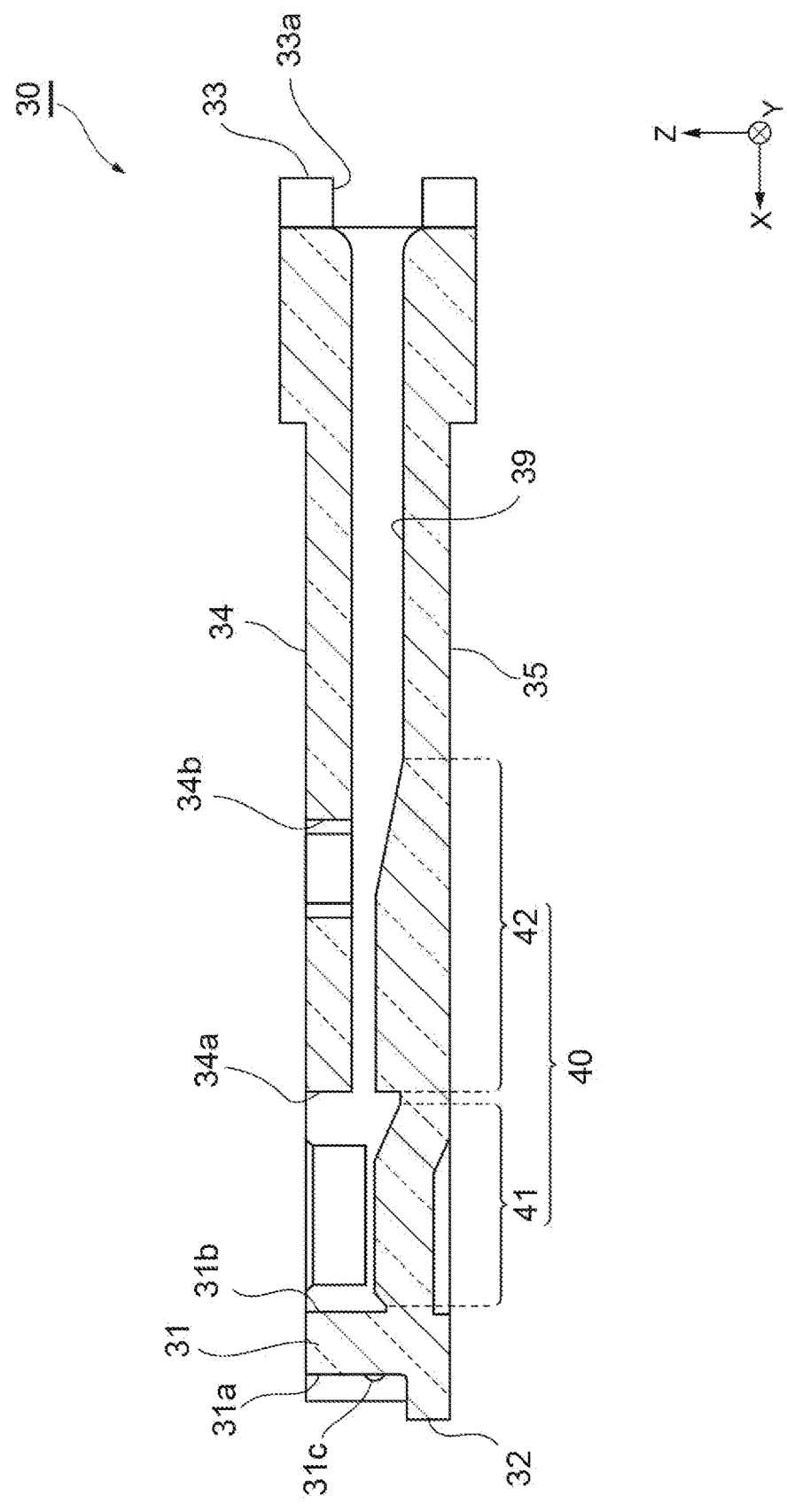
FIG. 4 is a cross-sectional view illustrating the ferrule of FIG. 3.

FIG. 3 is a perspective view illustrating the ferrule 30. FIG. 4 is a cross-sectional view illustrating the ferrule 30. FIG. 4 illustrates an XZ cross section of the ferrule 30. As illustrated in FIG. 4, the fiber groove 40 includes the first fiber groove portion 41 and a second fiber groove portion 42 in order from the lens portion 31 side in the X direction. The first fiber groove portion 41 is disposed behind the lens portion 31. The second fiber groove portion 42 is disposed further behind the first fiber groove portion 41. Therefore, the first fiber groove portion 41 is disposed closer to the lens portion 31 than the second fiber groove portion 42 in the X direction. In other words, the second fiber groove portion 42 is disposed on the side opposite to the lens portion 31 with respect to the first fiber groove portion 41 in the X direction.

Each of the first fiber groove portion 41 and the second fiber groove portion 42 is, for example, a V-groove. In other words, each of the first fiber groove portion 41 and the second fiber groove portion 42 has a V-shape opening upward (that is, the direction from the outside surface 35 toward the outside surface 34 in the Z direction) in the YZ cross section. The first fiber groove portion 41 is provided for positioning the optical fiber 20 with high accuracy with respect to the lens 31c. Therefore, the first fiber groove portion 41 is formed with high accuracy such that the optical axis of the optical fiber 20 supported by the first fiber groove portion 41 coincides with or is extremely close to the optical axis of the lens 31c when viewed from the X direction. The optical fiber 20 supported by the first fiber groove portion 41 is aligned with high accuracy with respect to the lens 31c.

Meanwhile, the second fiber groove portion 42 is provided for introducing the optical fiber 20 into the first fiber groove portion 41. The second fiber groove portion 42 determines the approximate position of the optical fiber 20 with respect to the lens 31c so that the optical fiber 20 inserted into the ferrule 30 from the opening portion 33a is easily introduced into the first fiber groove portion 41. In other words, the second fiber groove portion 42 performs rough positioning of the optical fiber 20 with respect to the lens 31c before positioning the optical fiber 20 with high accuracy in the first fiber groove portion 41. Therefore, in a state where the optical fiber 20 is supported by the second fiber groove portion 42, a larger tolerance is ensured for misalignment of the optical axis of the optical fiber 20 with respect to the optical axis of the lens 31c than in a state where the optical fiber 20 is supported by the first fiber groove portion 41. Therefore, the optical fiber 20 supported by the second fiber groove portion 42 is roughly positioned with respect to the lens 31c before reaching the first fiber groove portion 41.

Figure 5:
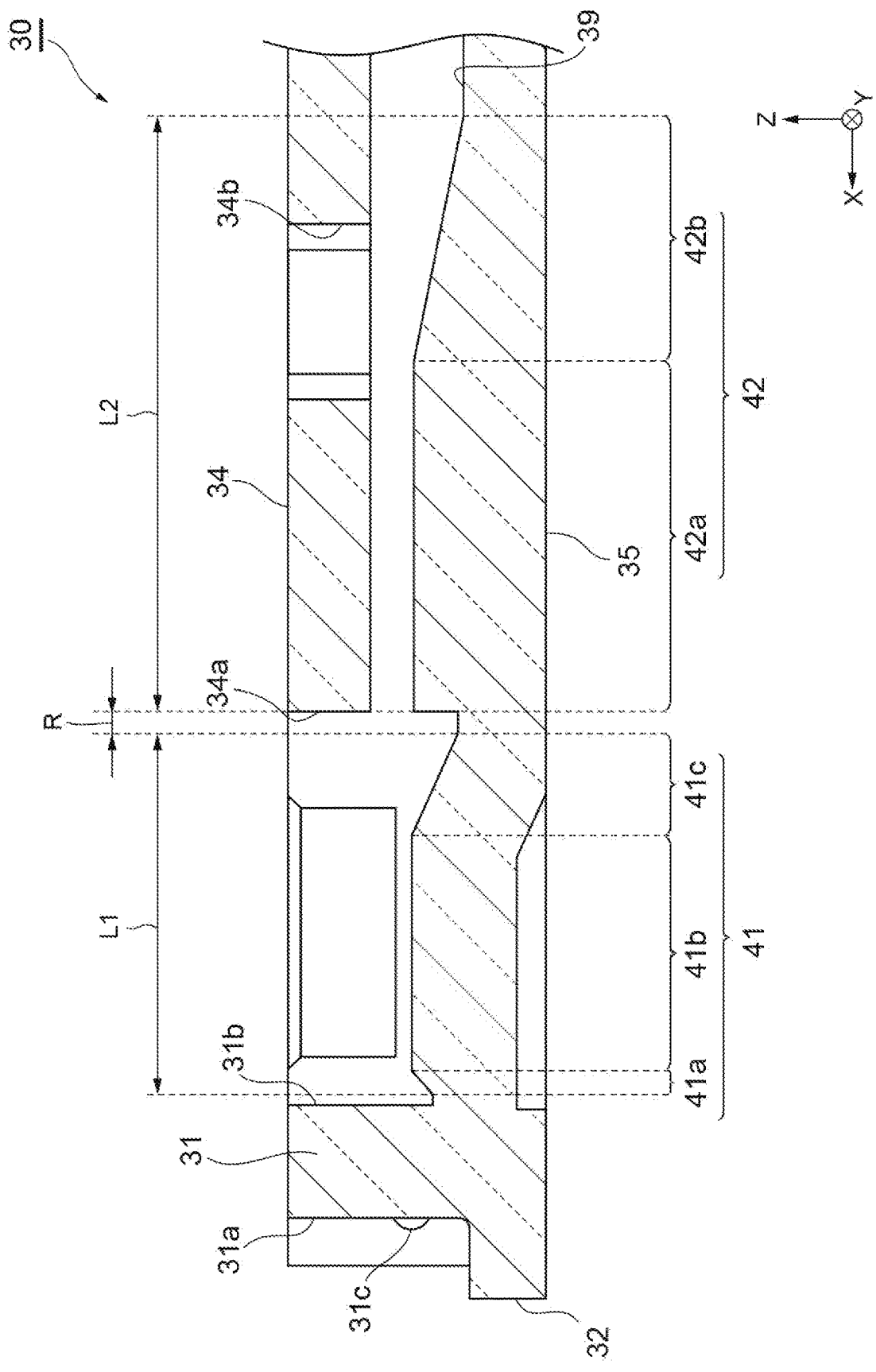
FIG. 5 is a partially enlarged cross-sectional view of the ferrule of FIG. 4.
Figure 6:
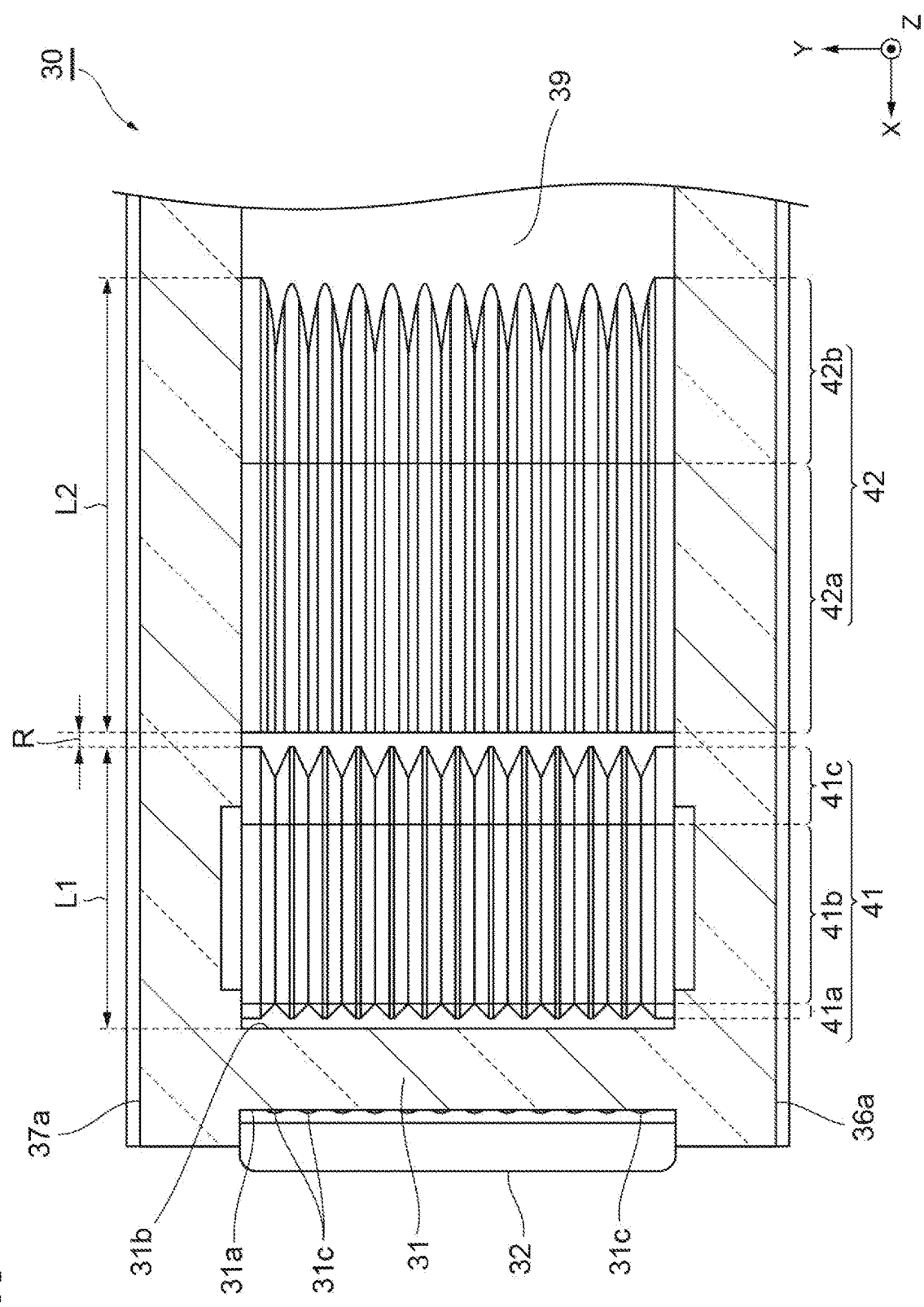
FIG. 6 is another cross-sectional view illustrating the ferrule of FIG. 3.

Here, the configurations of the first fiber groove portion 41 and the second fiber groove portion 42 will be described in more detail. FIG. 5 is an enlarged cross-sectional view illustrating the vicinity of the first fiber groove portion 41 and the second fiber groove portion 42 of FIG. 4. FIG. 6 is another cross-sectional view illustrating the vicinity of the first fiber groove portion 41 and the second fiber groove portion 42. FIG. 5 illustrates an XZ cross section of the ferrule 30. FIG. 6 illustrates an XY cross section of the ferrule 30.

As illustrated in FIG. 5, the first fiber groove portion 41 is formed at a position facing the window portion 34a in the Z direction. When viewed from the Z direction, the first fiber groove portion 41 fits inside the window portion 34a and is not present outside the window portion 34a. A total length L1 of the first fiber groove portion 41 in the X direction is shorter than the width of the window portion 34a in the X direction and longer than the width in the X direction of the lid portion B (see FIG. 2) disposed inside the window portion 34a. The total width of every first fiber groove portion 41 in the Y direction is smaller than the width of the window portion 34a in the Y direction.

The total length L1 of the first fiber groove portion 41 is, for example, set to the range of 3 times or more to 40 times or less the diameter of the optical fiber 20. The diameter of the optical fiber 20 here means 0.125 mm, which is the diameter of a general-purpose optical fiber. By the total length L1 of the first fiber groove portion 41 being large with respect to the diameter of the optical fiber 20 as described above, the posture of the optical fiber 20 supported by the first fiber groove portion 41 can be easily stabilized to a state along the X direction. The total length L1 of the first fiber groove portion 41 means the length in the X direction of the entire first fiber groove portion 41 including a tapered portion 41a, the straight portion 41b, and a tapered portion 41c, which will be described later.

Meanwhile, the second fiber groove portion 42 is not formed at a position facing the window portion 34a in the Z direction. The second fiber groove portion 42 is disposed behind the window portion 34a and the first fiber groove portion 41 at a predetermined interval in the X direction. As illustrated in FIGS. 5 and 6, the second fiber groove portion 42 is disposed behind the first fiber groove portion 41 by a distance R in the X direction. The distance R is, for example, set to the range of 0.01 mm or more to 3 mm or less. The second fiber groove portion 42 is formed at a position facing the window portion 34b behind the window portion 34a in the Z direction.

The window portion 34b is, for example, provided at a position facing the X-direction middle portion of the second fiber groove portion 42 in the Z direction. A total length L2 of the second fiber groove portion 42 in the X direction is longer than the width of the window portion 34b in the X direction. The total length L2 of the second fiber groove portion 42 in the X direction is set to be equal to or greater than the total length L1 of the first fiber groove portion 41 in the X direction. In other words, the total length L2 of the second fiber groove portion 42 is equal to or greater than the total length L1 of the first fiber groove portion 41. The total length L2 of the second fiber groove portion 42 means the length in the X direction of the entire second fiber groove portion 42 including a straight portion 42a and a tapered portion 42b, which will be described later.

As illustrated in FIGS. 5 and 6, the first fiber groove portion 41 includes the tapered portion 41a (second tapered portion), the straight portion 41b, and the tapered portion 41c (first tapered portion) in order from the lens portion 31 side in the X direction. The straight portion 41b is a part that linearly extends along the X direction behind the lens portion 31. In the straight portion 41b, the YZ cross-sectional shape of the first fiber groove portion 41 (that is, the opening shape of the V-groove) is constant at each position along the X direction. The straight portion 41b is formed such that the position of the optical fiber 20 with respect to the lens 31c is positioned with high accuracy.

Figure 7A:
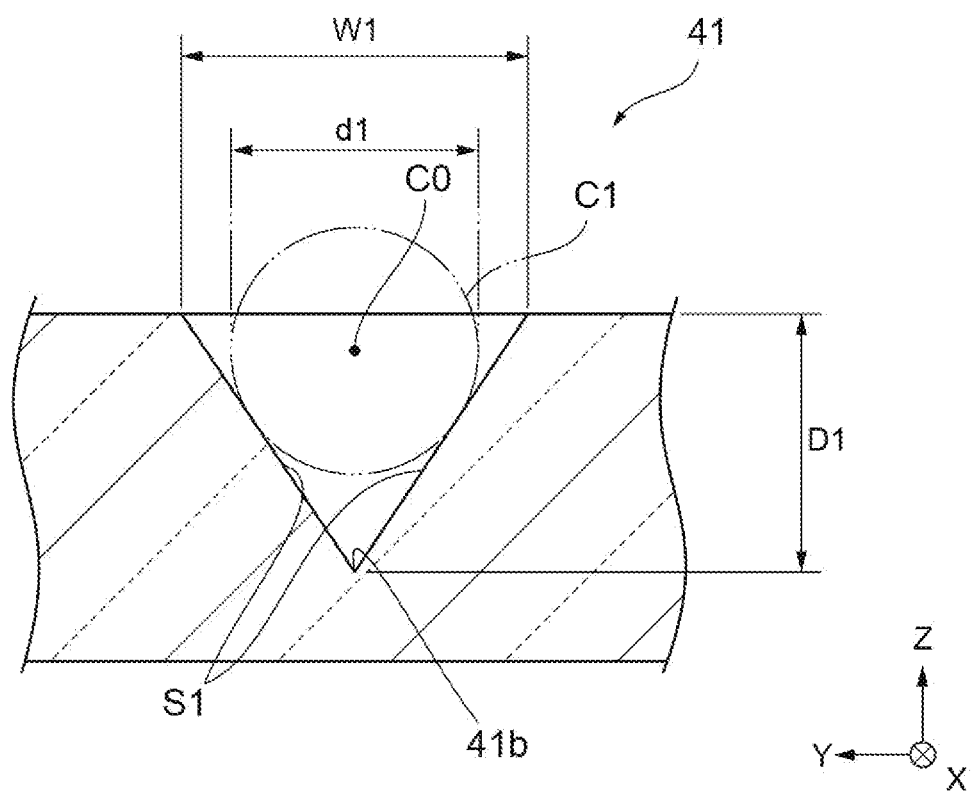
FIG. 7A is a cross-sectional view illustrating a straight portion of a first fiber groove portion.

FIG. 7A is a cross-sectional view illustrating the straight portion 41b of the first fiber groove portion 41. FIG. 7A illustrates a virtual circle C1 inscribed in a pair of inner surfaces S1 and S1 configuring the straight portion 41b. A center C0 of the virtual circle C1, for example, coincides with the optical axis of the lens 31c (see FIGS. 5 and 6) when viewed from the X direction, and a diameter d1 of the virtual circle C1 is the same as the diameter of the optical fiber 20 (see FIGS. 1 and 2). The optical axis of the optical fiber 20 supported by the straight portion 41b coincides with the optical axis of the lens 31c when viewed from the X direction. Therefore, in FIG. 7A, it can be said that the two-dot chain line indicating the virtual circle C1 indicates the outer shape of the optical fiber 20 supported by the straight portion 41b. When viewed from the X direction, the center C0 of the virtual circle C1 does not have to strictly coincide with the optical axis of the lens 31c and may be slightly misaligned from the optical axis of the lens 31c.

In this manner, the shape of the straight portion 41b is designed such that the optical axis of the optical fiber 20 supported by the straight portion 41b coincides with or is extremely close to the optical axis of the lens 31c. As a result, the optical fiber 20 is positioned with high accuracy in the straight portion 41b. Therefore, in a state where the optical fiber 20 is supported by the straight portion 41b, the optical fiber 20 is aligned with high accuracy with respect to the lens 31c. In the straight portion 41b, since the YZ cross-sectional shape of the first fiber groove portion 41 is constant at each position along the X direction, the diameter d1 of the virtual circle C1 is also constant at each position along the X direction. In this case, an opening width W1 and a depth D1 of the first fiber groove portion 41, which is a V-groove, are also constant at each position of the straight portion 41b along the X direction. The opening width W1 of the first fiber groove portion 41 is the maximum width of the opening part of the first fiber groove portion 41 in the Y direction. More specifically, the opening width W1 of the first fiber groove portion 41 is the Y-direction width of the opening part of the first fiber groove portion 41 on the forming surface where the first fiber groove portion 41 is formed. The depth D1 of the first fiber groove portion 41 is the Z-direction distance from the forming surface of the first fiber groove portion 41 to the bottom portion of the first fiber groove portion 41.

As illustrated in FIGS. 5 and 6, the tapered portion 41a of the first fiber groove portion 41 is positioned in front of the straight portion 41b. Specifically, the tapered portion 41a extends from the front end of the straight portion 41b to a position in front of the lens portion 31 (that is, a position slightly separated rearward from the rear end surface 31b of the lens portion 31) in the X direction. Therefore, the tapered portion 41a is disposed between the lens portion 31 and the straight portion 41b in the X direction. The YZ cross-sectional shape of the first fiber groove portion 41 changes at each position of the tapered portion 41a along the X direction. The tapered portion 41a is inclined such that the diameter d1 (see FIG. 7A) of the virtual circle C1 increases as the distance from the straight portion 41b increases in the X direction. The inclination of the tapered portion 41a may be a linear inclination or a curved inclination in the XZ cross section illustrated in FIG. 5.

As a result, the diameter d1 of the virtual circle C1 at the rear end of the tapered portion 41a is the same as the diameter d1 of the virtual circle C1 at the straight portion 41b, and the diameter d1 of the virtual circle C1 at the front end of the tapered portion 41a is larger than the diameter d1 of the virtual circle C1 at the straight portion 41b. For example, the opening width W1 of the first fiber groove portion 41 is constant at each position of the tapered portion 41a along the X direction, while the depth D1 of the first fiber groove portion 41 increases as the distance from the straight portion 41b increases in the X direction at the tapered portion 41a (see FIG. 7A). By the tapered portion 41*a* as described above being present, a space that allows the adhesive A (see FIG. 2) can be ensured in front of the straight portion 41*b*.

As illustrated in FIGS. 5 and 6, the tapered portion 41*c* of the first fiber groove portion 41 extends further rearward from the rear end of the straight portion 41*b*. The tapered portion 41*c* is disposed between the straight portion 41*b* and the second fiber groove portion 42 in the X direction. The YZ cross-sectional shape of the first fiber groove portion 41 changes at each position of the tapered portion 41*c* along the X direction. The tapered portion 41*c* is inclined such that the diameter d1 (see FIG. 7A) of the virtual circle C1 increases as the distance from the straight portion 41*b* increases in the X direction. The inclination of the tapered portion 41*c* may be a linear inclination or a curved inclination in the XZ cross section illustrated in FIG. 5.

As a result, the diameter d1 of the virtual circle C1 at the front end of the tapered portion 41*c* is the same as the diameter d1 of the virtual circle C1 at the straight portion 41*b*, and the diameter d1 of the virtual circle C1 at the rear end of the tapered portion 41*c* is larger than the diameter d1 of the virtual circle C1 at the straight portion 41*b*. Therefore, as for the diameter d1 of the virtual circle C1 at each position of the first fiber groove portion 41 along the X direction, the diameter d1 of the virtual circle C1 at the straight portion 41*b* is the smallest.

For example, the opening width W1 of the first fiber groove portion 41 is constant at each position of the tapered portion 41*c* along the X direction, while the depth D1 of the first fiber groove portion 41 increases as the distance from the straight portion 41*b* increases in the X direction at the tapered portion 41*c* (see FIG. 7A). By the tapered portion 41*c* as described above being present, the optical fiber 20 from the second fiber groove portion 42 can be guided into the straight portion 41*b* of the first fiber groove portion 41. Therefore, the tapered portion 41*c* functions as a guide portion that guides the optical fiber 20 from the second fiber groove portion 42 to the straight portion 41*b*.

As illustrated in FIGS. 5 and 6, the second fiber groove portion 42 includes the straight portion 42*a* and the tapered portion 42*b* in order from the first fiber groove portion 41 side in the X direction. The straight portion 42*a* is a part that linearly extends along the X direction behind the first fiber groove portion 41. The straight portion 42*a* extends rearward from a position separated by the distance R from the rear end of the tapered portion 41*c* of the first fiber groove portion 41. The tapered portion 42*b* extends further rearward from the rear end of the straight portion 42*a*. Therefore, the tapered portion 42*b* is disposed on the side opposite to the first fiber groove portion 41 with respect to the straight portion 42*a* in the X direction. The window portion 34*b* is positioned opposite in the Z direction to the connection part between the straight portion 42*a* and the tapered portion 42*b*.

The YZ cross-sectional shape of the second fiber groove portion 42 (that is, the opening shape of the V-groove) is constant at each position of the straight portion 42*a* along the X direction. The straight portion 42*a* is formed so as to determine the approximate position of the optical fiber 20 with respect to the lens 31*c*. Accordingly, the optical fiber 20 supported by the straight portion 42*a* is roughly positioned with respect to the lens 31*c*.

FIG. 7B is a cross-sectional view illustrating the straight portion 42*a* of the second fiber groove portion 42. FIG. 7B illustrates a virtual circle C2 inscribed in a pair of inner surfaces S2 and S2 configuring the straight portion 42*a* together with the virtual circle C1 illustrated in FIG. 7A. The virtual circle C2 forms a concentric circle centered on the center C0 of the virtual circle C1 (that is, the optical axis of the lens 31*c*) and having a diameter d2 larger than the virtual circle C1. Therefore, the misalignment tolerance with respect to the lens 31*c* of the optical fiber 20 supported by the straight portion 42*a* of the second fiber groove portion 42 is ensured to be larger than the misalignment tolerance with respect to the lens 31*c* of the optical fiber 20 supported by the straight portion 41*b* of the first fiber groove portion 41. In this manner, the shape of the straight portion 42*a* is formed so as to roughly position the optical fiber 20 with respect to the lens 31*c*.

Since the YZ cross-sectional shape of the second fiber groove portion 42 is constant at each position of the straight portion 42*a* along the X direction, the diameter d2 of the virtual circle C2 is also constant at each position of the straight portion 42*a* along the X direction. In this case, an opening width W2 and a depth D2 of the second fiber groove portion 42, which is a V-groove, are also constant at each position of the straight portion 42*a* along the X direction. The opening width W2 of the second fiber groove portion 42 is the maximum width of the opening part of the second fiber groove portion 42 in the Y direction. More specifically, the opening width W2 of the second fiber groove portion 42 is the Y-direction width of the opening part of the second fiber groove portion 42 on the forming surface where the second fiber groove portion 42 is formed. The depth D2 of the second fiber groove portion 42 is the Z-direction distance from the forming surface of the second fiber groove portion 42 to the bottom portion of the second fiber groove portion 42. The diameter d2 of the virtual circle C2 is larger than the diameter d1 of the virtual circle C1. Therefore, the opening width W2 of the straight portion 42*a* is larger than the opening width W1 of the straight portion 41*b*, and the depth D2 of the straight portion 42*a* is deeper than the depth D1 of the straight portion 41*b*.

Figure 8:
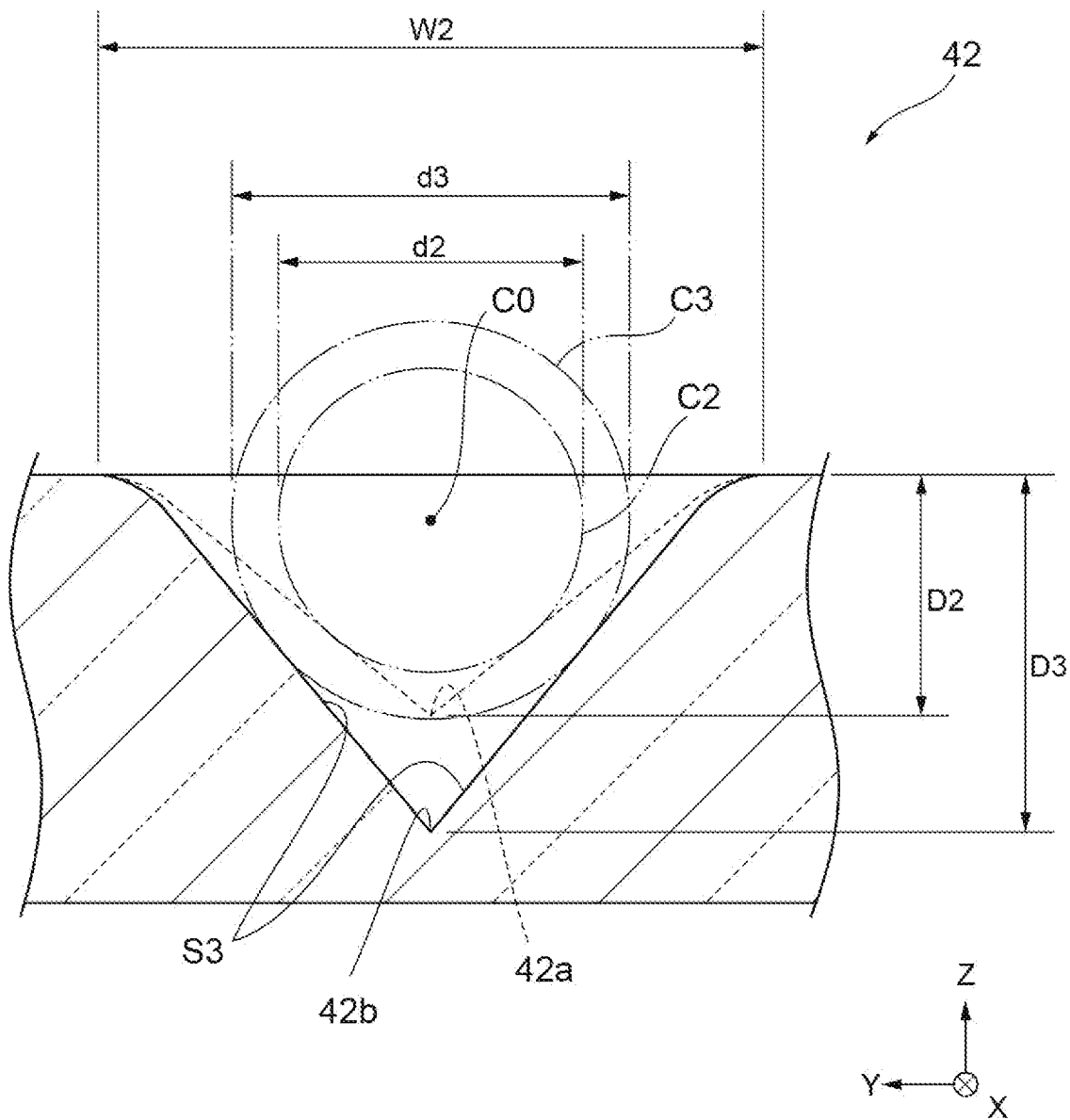
FIG. 8 is a cross-sectional view illustrating a tapered portion of the second fiber groove portion.

FIG. 8 is a cross-sectional view illustrating the tapered portion 42*b* of the second fiber groove portion 42. FIG. 8 illustrates a virtual circle C3 inscribed in a pair of inner surfaces S3 and S3 configuring the tapered portion 42*b* together with the virtual circle C2 illustrated in FIG. 7B. The virtual circle C3 forms a concentric circle centered on the center C0 of the virtual circle C1 (that is, the optical axis of the lens 31*c*) and having a diameter d3 larger than the virtual circle C2. The YZ cross-sectional shape of the second fiber groove portion 42 changes at each position of the tapered portion 42*b* along the X direction. The tapered portion 42*b* is inclined such that the diameter d3 of the virtual circle C3 increases as the distance from the straight portion 42*a* increases in the X direction. The inclination of the tapered portion 42*b* may be a linear inclination or a curved inclination in the XZ cross section illustrated in FIG. 5.

As a result, the diameter d3 of the virtual circle C3 at the rear end of the tapered portion 42*b* is larger than the diameter d2 of the virtual circle C2 at the straight portion 42*a*. The diameter d3 of the virtual circle C3 at the front end of the tapered portion 42*b* is the same as the diameter d2 of the virtual circle C2 at the straight portion 42*a*. Therefore, as for the virtual circles C2 and C3 at each position of the second fiber groove portion 42 along the X direction, the diameter d2 of the virtual circle C2 at the straight portion 42*a* is the smallest. The diameter d1 of the virtual circle C1 at the straight portion 41*b* of the first fiber groove portion 41 is smaller than the diameter d2 of the virtual circle C2 at the straight portion 42*a* of the second fiber groove portion 42.

For example, the opening width W2 of the second fiber groove portion 42 is constant at each position of the tapered portion 42*b* along the X direction, while a depth D3 of the second fiber groove portion 42 increases as the distance from the straight portion 42*a* increases in the X direction at the tapered portion 42*b* (see FIG. 8). By the tapered portion 42*b* as described above being present, the optical fiber 20 inserted from the opening portion 33*a* can be guided into the straight portion 42*a*. Therefore, the tapered portion 42*b* functions as a guide portion that guides the optical fiber 20 to the straight portion 42*a*.

In manufacturing the optical connector 10 described above, first, the plurality of optical fibers 20 are inserted into the accommodation hole 39 in the ferrule 30 from the opening portion 33*a* of the rear end surface 33 of the ferrule 30. Then, each optical fiber 20 inserted in the accommodation hole 39 is disposed in each fiber groove 40. At this time, the optical fiber 20 is guided to the straight portion 42*a* by the tapered portion 42*b* of the second fiber groove portion 42. The optical fiber 20 is straightened to a state along the X direction in the straight portion 42*a*, and the approximate position thereof with respect to the lens 31*c* is determined in the straight portion 42*a*. In this manner, rough positioning of the optical fiber 20 is performed in the second fiber groove portion 42.

After that, the optical fiber 20 is introduced from the straight portion 42*a* of the second fiber groove portion 42 into the tapered portion 41*c* of the first fiber groove portion 41. Then, the optical fiber 20 is guided from the tapered portion 41*c* to the straight portion 41*b*. The optical fiber 20 is straightened to a state along the X direction in the straight portion 41*b*, and the precise position thereof with respect to the lens 31*c* is determined in the straight portion 41*b*. In this manner, high-accuracy positioning of the optical fiber 20 is performed in the first fiber groove portion 41. In other words, when viewed from the X direction, the optical axis of the optical fiber 20 supported by the straight portion 41*b* is disposed so as to coincide with or be extremely close to the optical axis of the lens 31*c*. After that, the optical fiber 20 is transferred from the straight portion 41*b* to the tapered portion 41*a* and abuts against the rear end surface 31*b* of the lens portion 31. The optical fiber 20 may be separated from the rear end surface 31*b* of the lens portion 31. In other words, the optical fiber 20 may be disposed with a predetermined interval with respect to the rear end surface 31*b* of the lens portion 31.

After that, the adhesive A is injected into the ferrule 30 from the window portion 34*a*, and the lid portion B is disposed inside the window portion 34*a* (see FIG. 2). At this time, the adhesive A injected in the ferrule 30 also spreads in the gap between the lid portion B and each optical fiber 20. The adhesive A hardens with the lid portion B pressing the optical fibers 20 against the fiber grooves 40, respectively. Accordingly, the optical fibers 20 are respectively fixed to the fiber grooves 40. As a result, the position of each optical fiber 20 with respect to the ferrule 30 is fixed.

Figure 9A:
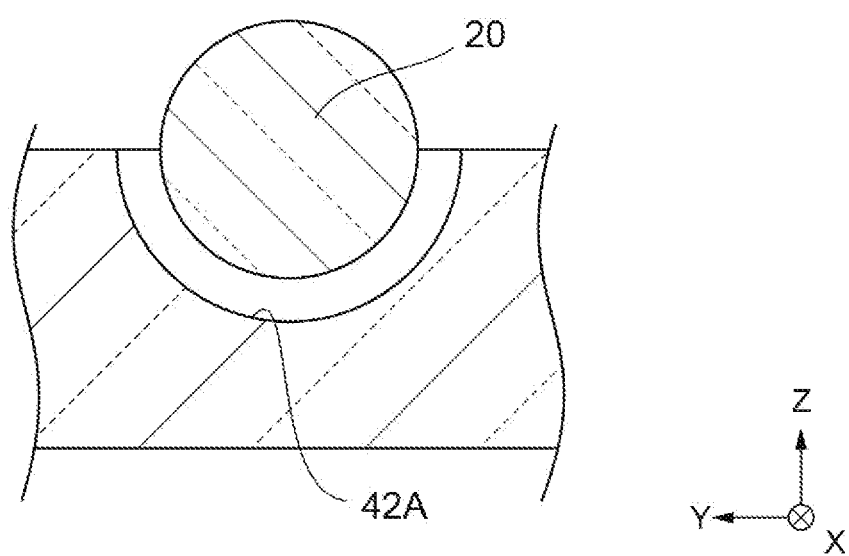
FIG. 9A is a cross-sectional view illustrating a modification example of the shape of the second fiber groove portion.
Figure 9B:
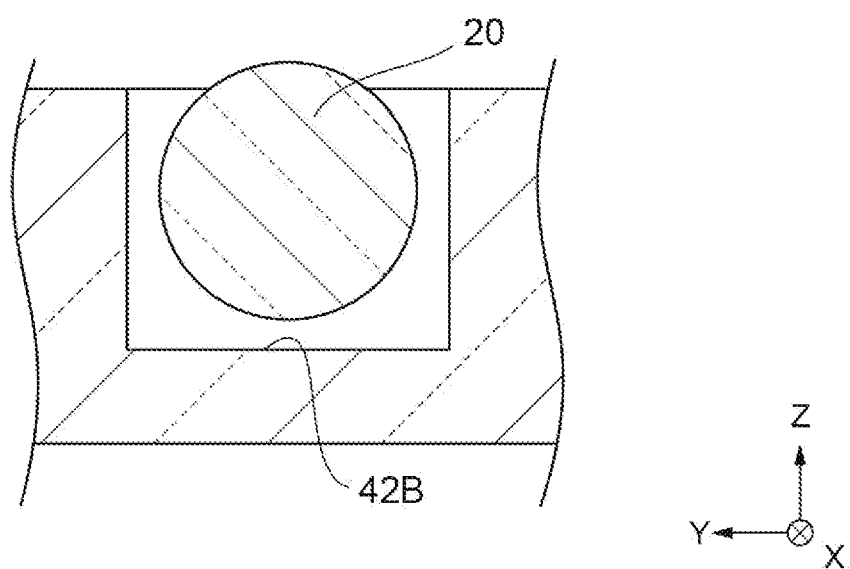
FIG. 9B is a cross-sectional view illustrating another modification example of the shape of the second fiber groove portion.
Figure 9C:
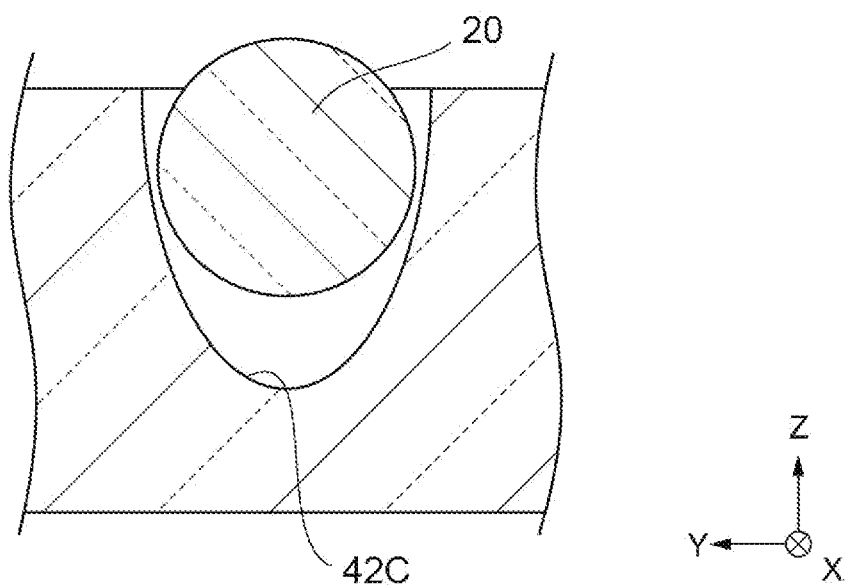
FIG. 9C is a cross-sectional view illustrating another modification example of the shape of the second fiber groove portion.

The configurations of the first fiber groove portion 41 and the second fiber groove portion 42 can be changed as appropriate without being limited to the configurations described above. For example, the second fiber groove portion 42 may be a groove different in shape from the first fiber groove portion 41. In other words, the second fiber groove portion 42 is not limited to a V-groove that is V-shaped in the YZ cross section and may be a groove having another shape. FIGS. 9A, 9B, and 9C are cross-sectional views illustrating modification examples of the shape of the second fiber groove portion 42.

As illustrated in FIG. 9A, a second fiber groove portion 42A may be a semicircular groove that is semicircular in the YZ cross section. As illustrated in FIG. 9B, a second fiber groove portion 42B may be a rectangular groove that is rectangular in the YZ cross section. As illustrated in FIG. 9C, a second fiber groove portion 42C may be a U-groove that is U-shaped in the YZ cross section. Likewise, the first fiber groove portion 41 does not necessarily have to be a V-groove and may be a groove having another shape. The second fiber groove portion 42 may not be separated from the first fiber groove portion 41 in the X direction and may be directly connected to the first fiber groove portion 41 in the X direction.

The second fiber groove portion 42 may not include the tapered portion 42*b* and may include only the straight portion 42*a*. The second fiber groove portion 42 may not include the straight portion 42*a* and may include only the tapered portion 42*b*. The first fiber groove portion 41 may not include the tapered portion 41*a* and the tapered portion 41*c* and may include only the straight portion 41*b*. The total length L2 of the second fiber groove portion 42 may be shorter than the total length L1 of the first fiber groove portion 41.

Figure 10:
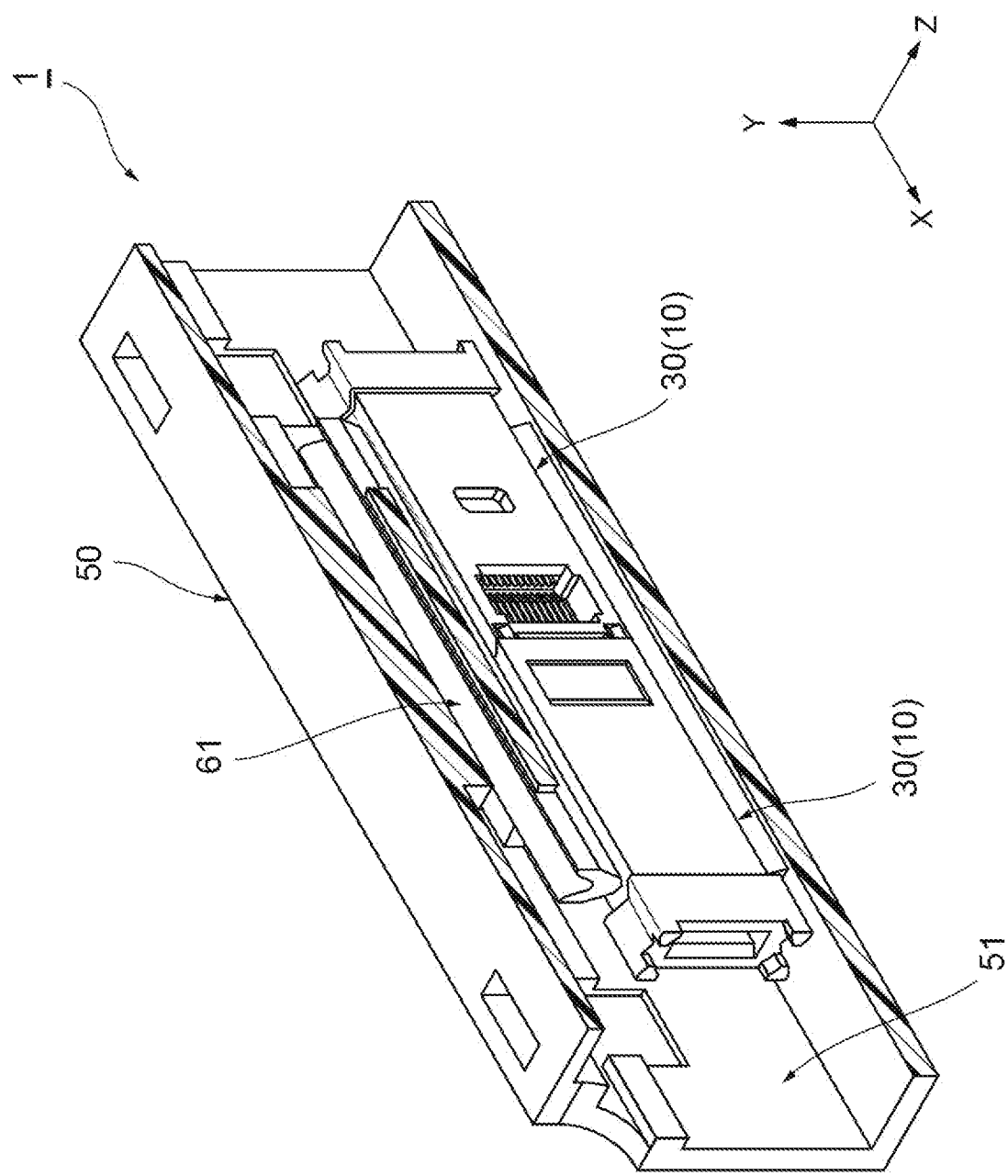
FIG. 10 is a perspective view illustrating an optical connection structure including the optical connector.
Figure 11:
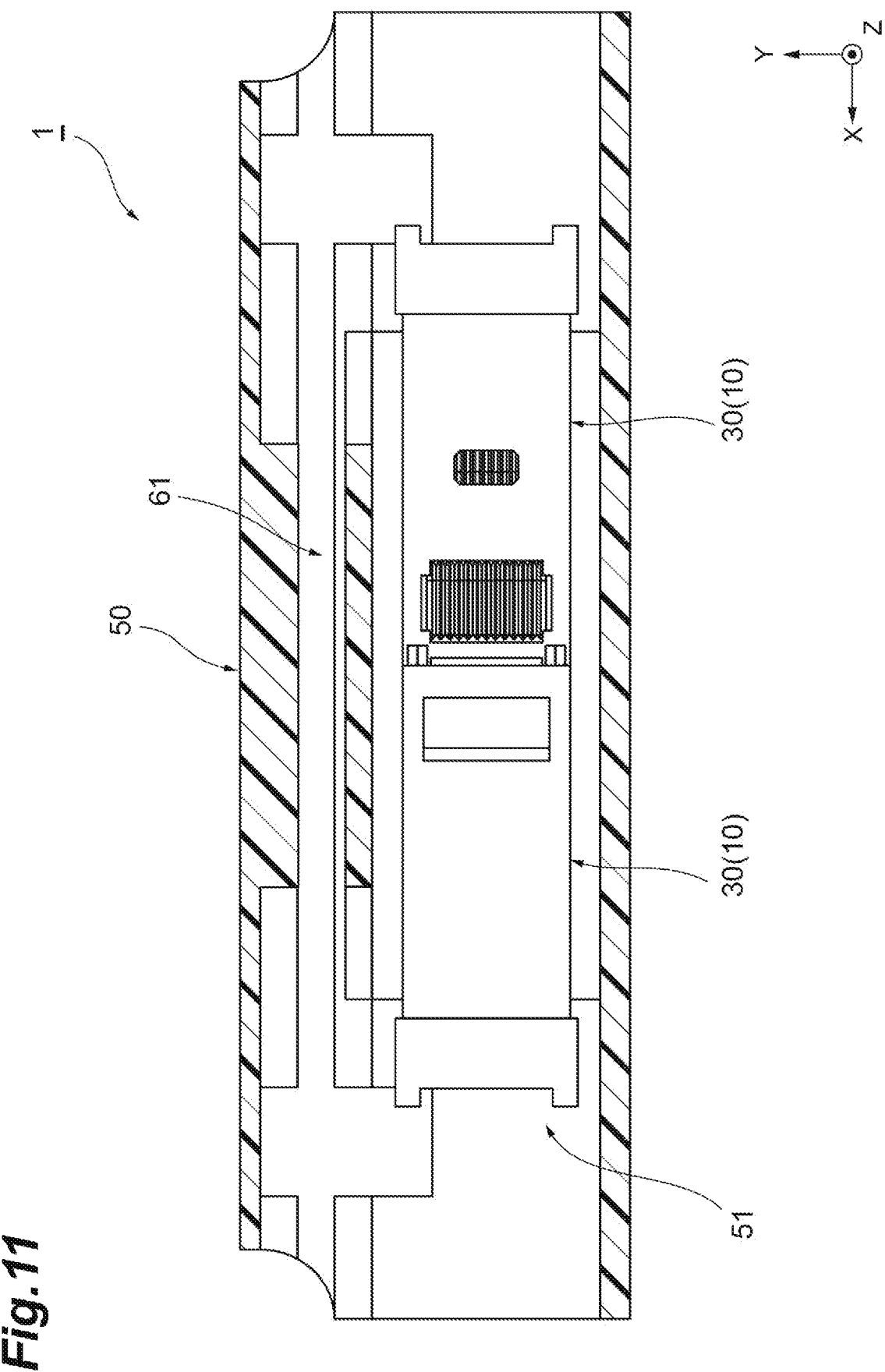
FIG. 11 is a plan view illustrating the optical connection structure of FIG. 10.
Figure 12:
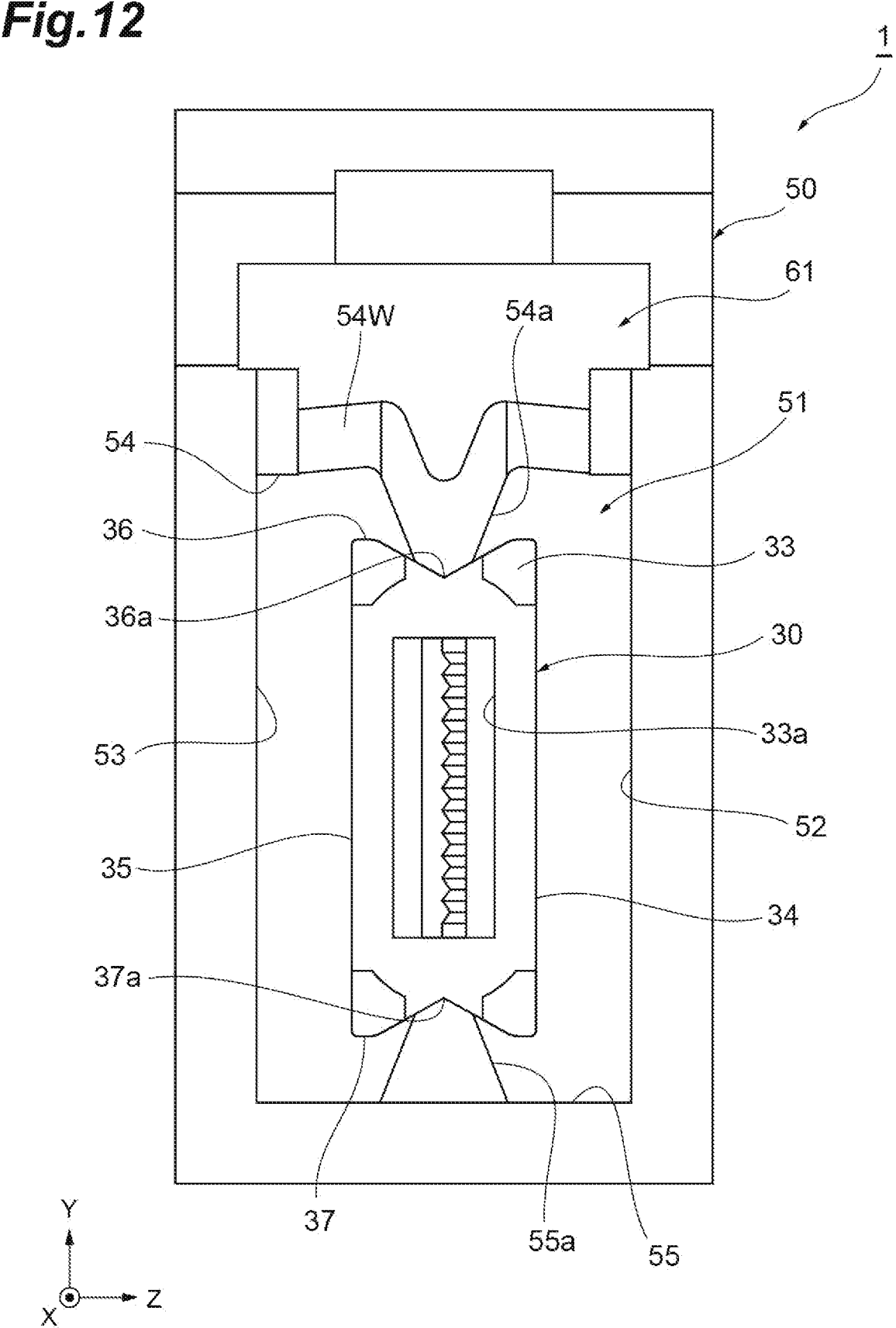
FIG. 12 is a rear view illustrating the optical connection structure of FIG. 10.

Next, an optical connection structure 1 including the optical connector 10 described above will be described with reference to FIGS. 10, 11, and 12. FIG. 10 is a perspective view illustrating the optical connection structure 1. FIG. 11 is a plan view illustrating the optical connection structure 1. FIG. 12 is a rear view illustrating the optical connection structure 1. FIGS. 10, 11, and 12 illustrate the optical connector 10 with the plurality of optical fibers 20 omitted (that is, with only the ferrule 30 illustrated). FIGS. 10 and 11 illustrate a cut surface with the adapter 50 of the optical connection structure 1 cut along the XY plane.

As illustrated in FIGS. 10 and 11, the optical connection structure 1 includes a pair of the optical connectors 10 and 10 disposed so as to face each other in the X direction and the adapter 50 into which the pair of optical connectors 10 and 10 are inserted. The pair of optical connectors 10 and 10 are disposed in a state of being mutually upside down. The pair of optical connectors 10 and 10 are fitted to the adapter 50 such that the respective ferrules 30 and 30 face each other in the adapter 50. In the adapter 50, the pair of ferrules 30 and 30 may abut against and be in contact with each other or may be disposed at a predetermined distance from each other.

The adapter 50 is, for example, configured by an elastic material such as polyetherimide (PEI), polybutylene terephthalate (PBT), polyphenylene sulfide (PPS), polycarbonate (PC), polymethyl methacrylate (PMMA), polyethersulfone (PES), and polyamide (PA). From the viewpoint of reducing the difference between the coefficient of linear expansion of the material of the adapter 50 and the coefficient of linear expansion of the material of the ferrule 30, the same material as the ferrule 30 may be used as the material of the adapter 50.

The adapter 50 has a tubular shape capable of accommodating the pair of ferrules 30 and 30 and extends along the X direction. In the X direction, the total length of the adapter 50 is, for example, longer than the sum of the total lengths of the pair of ferrules 30 and 30 that are connected to each other. As illustrated in FIG. 12, the adapter 50 has a rectangular tube shape when viewed from the X direction. The adapter has an insertion hole 51 configuring the inside of the rectangular tube shape. The insertion hole 51 is a through hole penetrating the adapter 50 in the X direction. The insertion hole 51 is rectangular when viewed from the X direction and is configured by four inner surfaces 52, 53, 54, and 55.

The inner surface 52 faces the outside surface 34 of the ferrule 30 in the Z direction, and the inner surface 53 faces the outside surface 35 of the ferrule 30 in the Z direction. The inner surface 54 faces the outside surface 36 of the ferrule 30 in the Y direction, and the inner surface 55 faces the outside surface 37 of the ferrule 30 in the Y direction. The inner surface 54 and the inner surface 55 are provided with a V-protrusion 54a and a V-protrusion 55a for guiding the V-groove 36a and the V-groove 37a of the ferrule 30, respectively. The V-protrusion 54a and the V-protrusion 55a are, for example, disposed at positions mutually symmetrical with respect to the middle of the insertion hole 51 in the Y direction. Each of the V-protrusion 54a and the V-protrusion 55a is a protrusion that is V-shaped in the YZ cross section. The V-protrusion 54a protrudes from the inner surface 54 toward the outside surface 36 of the ferrule 30 and abuts against the V-groove 36a of the outside surface 36. The V-protrusion 54a is, for example, provided on the inner surface 54 so as to continuously extend along the X direction. The V-protrusion 55a protrudes from the inner surface 55 toward the outside surface 37 of the ferrule 30 and abuts against the V-groove 37a of the outside surface 37. The V-protrusion 55a is, for example, provided on the inner surface 55 so as to continuously extend along the X direction.

The V-protrusion 54a has a shape corresponding to the V-groove 36a. The opening angle of the V-protrusion 54a (that is, the angle formed by the pair of outer surfaces configuring the V-protrusion 54a) is set smaller than the opening angle of the V-groove 36a of the ferrule 30 (that is, the angle formed by the pair of inner surfaces configuring the V-groove 36a). The top portion of the V-protrusion 54a is, for example, rounded. The V-protrusion 55a has a shape corresponding to the V-groove 37a. The V-protrusion 55a has, for example, the same shape as the V-protrusion 54a. The Y-direction separation distance between the V-protrusion 54a and the V-protrusion 55a is set slightly smaller than the Y-direction width between the V-groove 36a and the V-groove 37a of the ferrule 30. The Y-direction separation distance between the V-protrusion 54a and the V-protrusion 55a can be defined as the Y-direction distance between the top portion of the V-protrusion 54a and the top portion of the V-protrusion 55a with the ferrule 30 not inserted in the adapter 50. The Y-direction width between the V-groove 36a and the V-groove 37a can be defined as the Y-direction distance between the bottom portion of the V-groove 36a and the bottom portion of the V-groove 37a.

The adapter 50 has a hollow portion 61 provided on one outer side of the insertion hole 51 in the Y direction. The hollow portion 61 is positioned outside the insertion hole 51 with a wall portion 54W configuring the inner surface 54 interposed therebetween in the Y direction. In other words, the hollow portion 61 is adjacent to the insertion hole 51 via the wall portion 54W in the Y direction. The hollow portion 61 linearly extends along the X direction at, for example, a position aligned with the insertion hole 51 in the Y direction. The wall portion 54W extends in the Z direction between the hollow portion 61 and the insertion hole 51 so as to separate the hollow portion 61 and the insertion hole 51. The thickness of the wall portion 54W (that is, the width of the wall portion 54W in the Y direction) is, for example, constant. The thickness of the wall portion 54W is sufficiently small to allow elastic deformation of the V-protrusion 54a. Likewise, the thickness of the wall portion configuring the inner surface 55 is sufficiently small to allow elastic deformation of the V-protrusion 55a. By the hollow portion 61 as described above being present, it is possible to make it easier to elastically deform the V-protrusion 54a. No hollow portion is provided on the other outer side of the insertion hole 51 in the Y direction (that is, the side opposite to the insertion hole 51 with respect to the inner surface 55 in the Y direction).

In the optical connection structure 1 described above, in inserting the ferrule 30 into the adapter 50, the V-groove 36a and the V-groove 37a of the ferrule 30 are fitted to the V-protrusion 54a and the V-protrusion 55a of the adapter 50, respectively. At this time, the V-protrusion 54a enters and abuts against the V-groove 36a of the ferrule 30, and the V-protrusion 55a enters and abuts against the V-groove 37a of the ferrule 30. Here, as described above, the separation distance between the V-protrusion 54a and the V-protrusion 55a of the adapter 50 is set smaller than the width between the V-groove 36a and the V-groove 37a of the ferrule 30. Therefore, the V-protrusion 54a and the V-protrusion 55a of the adapter 50 receive reaction force from the V-groove 36a and the V-groove 37a of the ferrule 30 and are elastically deformed to the outside of the ferrule 30 in the Y direction. Then, force is applied to the ferrule 30 to cause the V-protrusion 54a and the V-protrusion 55a of the adapter 50 to return to the original positions thereof, and the ferrule 30 is sandwiched and fixed by the V-protrusion 54a and the V-protrusion 55a of the adapter 50.

As a result, the V-protrusion 54a and the V-protrusion 55a of the adapter 50 come into contact with the V-groove 36a and the V-groove 37a of the ferrule 30, respectively. Therefore, each of the Y-direction gap between the V-protrusion 54a and the V-groove 36a is zero, and the Y-direction gap between the V-protrusion 55a and the V-groove 37a is zero. As a result, the position of the ferrule 30 with respect to the adapter 50 is defined in the YZ plane, and the rotation-direction position of the ferrule 30 with respect to the adapter 50 is defined. After that, a spring (not illustrated) attached to the rear of the ferrule 30 biases the ferrule 30 to the mating ferrule 30 side in the X direction. As a result, the X-direction position of the ferrule 30 with respect to the adapter 50 is defined (see FIGS. 10 and 11). In this manner, the position of the ferrule 30 with respect to the adapter 50 is defined.

In a case where the Z-direction gap between the V-protrusion 54a and the V-groove 36a (that is, the difference between the Z-direction width of the V-protrusion 54a and the Z-direction width of the V-groove 36a) and the Z-direction gap between the V-protrusion 55a and the V-groove 37a (that is, the difference between the Z-direction width of the V-protrusion 55a and the Z-direction width of the V-groove 37a) are present, the size of these gaps may result in positional misalignment or angular misalignment between the ferrule 30 and the mating ferrule 30. Therefore, it is desirable to set these gaps as small as possible.

In the present embodiment, the V-protrusion 54a and the V-protrusion 55a are parts configuring a part of the adapter 50 configured by an elastic material, and thus both the V-protrusion 54a and the V-protrusion 55a are configured to be elastically deformable. However, for example, only the V-protrusion 54a may be configured to be elastically deformable. In this case, the V-protrusion 55a may not be configured to be elastically deformable. In the present embodiment, the hollow portion 61 is provided outside the wall portion 54W where the V-protrusion 54a is provided (that is, the side opposite to the insertion hole 51 with respect to the wall portion 54W). Therefore, by configuring the part near the wall portion 54W with an elastic material, only the V-protrusion 54a can be configured to be elastically deformable. In this case, in inserting the ferrule 30 into the adapter 50, the V-groove 37a of the ferrule 30 is disposed so as to abut against the V-protrusion 55a, which is not deformed elastically, and the V-groove 36a of the ferrule 30 is allowed to abut against the V-protrusion 54a, which is deformed elastically. At this time, the V-protrusion 54a receives reaction force from the V-groove 36a and is elastically deformed, and force is applied to the ferrule 30 to cause the V-protrusion 54a to return to the original position thereof. As a result, the ferrule 30 is sandwiched and fixed by the V-protrusion 54a and the V-protrusion 55a, and the position of the ferrule 30 with respect to the adapter 50 is defined.

In the present embodiment, the outside surface 36 and the outside surface 37 of the ferrule 30 are provided with the V-groove 36a and the V-groove 37a, respectively. Alternatively, grooves different in shape may be provided instead of the V-groove 36a and the V-groove 37a. For example, the outside surface 36 and the outside surface 37 of the ferrule 30 may be provided with U-grooves that are U-shaped in the YZ cross section, semicircular grooves that are semicircular in the YZ cross section, or rectangular grooves that are rectangular in the YZ cross section. In accordance therewith, the inner surface 54 and the inner surface 55 of the adapter 50 may be provided with elliptical protrusions that are elliptical in the YZ cross section, semicircular protrusions that are semicircular in the YZ cross section, or rectangular protrusions that are rectangular in the YZ cross section instead of the V-protrusion 54a and the V-protrusion 55a. Alternatively, the outside surface 36 and the outside surface 37 of the ferrule 30 may be provided with protrusions, and the inner surface 54 and the inner surface 55 of the adapter 50 may be provided with grooves. In this manner, insofar as the position of the ferrule 30 with respect to the adapter 50 can be defined when the ferrule is fitted to the adapter 50, the groove-protrusion combinations in the ferrule 30 and the adapter 50 can be changed as appropriate.

Effects obtained by the ferrule 30 and the optical connector 10 according to the present embodiment described above will be described. In the present embodiment, when the optical fiber 20 is inserted into the ferrule 30 from the opening portion 33a, the optical fiber 20 is introduced into the first fiber groove portion 41 by the second fiber groove portion 42 and the optical fiber 20 is positioned with respect to the lens 31c in the first fiber groove portion 41. In this manner, by the second fiber groove portion 42 being present to introduce the optical fiber 20 into the first fiber groove portion 41, it is possible to reduce collision of the optical fiber 20 with the wall portion between the fiber grooves 40 and reliably dispose the optical fiber 20 in the first fiber groove portion 41 in inserting the optical fiber 20 into the ferrule 30. Therefore, according to the present embodiment, workability can be improved in assembling the optical fiber 20 to the ferrule 30.

In the present embodiment, each of the first fiber groove portion 41 and the second fiber groove portion 42 is V-shaped in the YZ cross section. As a result, the position of the optical fiber 20 with respect to the lens 31c can be positioned more accurately.

In the present embodiment, the opening width W2 of the second fiber groove portion 42 is larger than the opening width W1 of the first fiber groove portion 41 in the YZ cross section. As a result, the misalignment tolerance with respect to the lens 31c of the optical fiber 20 supported by the second fiber groove portion 42 can be ensured to be larger than the misalignment tolerance with respect to the lens 31c of the optical fiber 20 supported by the first fiber groove portion 41. As a result, when the optical fiber 20 is inserted into the ferrule 30, it is possible to highly accurately determine the position of the optical fiber 20 with respect to the lens 31c in the first fiber groove portion 41 after determining the approximate position of the optical fiber 20 with respect to the lens 31c in the second fiber groove portion 42. Therefore, according to the configuration described above, the second fiber groove portion 42 for introducing the optical fiber 20 into the first fiber groove portion 41 can be suitably realized.

In the present embodiment, in the YZ cross section, the diameter d2 of the virtual circle C2 centered on the optical axis of the lens 31c and inscribed in the second fiber groove portion 42 is larger than the diameter d1 of the virtual circle C1 centered on the optical axis of the lens 31c and inscribed in the first fiber groove portion 41. As a result, the misalignment tolerance of the optical fiber 20 supported by the second fiber groove portion 42 with respect to the lens 31c can be ensured to be larger than the misalignment tolerance of the optical fiber supported by the first fiber groove portion 41 with respect to the lens 31c. As a result, when the optical fiber 20 is inserted into the ferrule 30, it is possible to highly accurately determine the position of the optical fiber 20 with respect to the lens 31c in the first fiber groove portion 41 after determining the approximate position of the optical fiber 20 with respect to the lens 31c in the second fiber groove portion 42. Therefore, according to the configuration described above, the second fiber groove portion 42 for introducing the optical fiber 20 into the first fiber groove portion 41 can be suitably realized.

In the present embodiment, the second fiber groove portion 42 includes the straight portion 42a where the diameter d2 of the virtual circle C2 is constant at each position along the X direction and the tapered portion 42b inclined such that the diameter d3 of the virtual circle C3 increases as the distance from the straight portion 42a increases. By the tapered portion 42b as described above being present, the optical fiber 20 inserted from the opening portion 33a into the ferrule 30 can be reliably guided into the straight portion 42a. Further, by the straight portion 42a being present, the posture of the optical fiber 20 can be stabilized to a state along the X direction and the optical fiber 20 can be smoothly introduced into the first fiber groove portion 41 with the posture stabilized. Therefore, according to the configuration described above, the optical fiber 20 can be reliably and smoothly introduced into the first fiber groove portion 41.

In the present embodiment, the total length L2 of the second fiber groove portion 42 is equal to or greater than the total length L1 of the first fiber groove portion 41. As a result, the posture of the optical fiber 20 can be more reliably stabilized in the second fiber groove portion 42.

In the present embodiment, the second fiber groove portion 42 is disposed at a predetermined interval from the first fiber groove portion 41. In this configuration, the first fiber groove portion 41 can be manufactured with high accuracy by forming the first fiber groove portion 41 separately from the second fiber groove portion 42. As a result, the first fiber groove portion 41 for positioning the optical fiber 20 with respect to the lens 31c can be suitably obtained.

In the present embodiment, the first fiber groove portion 41 is fitted inside the window portion 34a when viewed from the Z direction. As a result, the window portion 34a can be used not only as an injection window portion for injecting the adhesive A into the ferrule 30 but also for alignment work in introducing the optical fiber 20 into the first fiber groove portion 41. As a result, workability can be further improved in assembling the optical fiber 20.

In the present embodiment, the outside surface 36 and the outside surface 37 are provided with the V-groove 36a and the V-groove 37a for guiding insertion into the adapter 50 along the X direction, respectively. As a result, the position of the ferrule 30 with respect to the adapter 50 can be determined using the V-groove 36a and the V-groove 37a. In other words, the ferrule 30 can be positioned with respect to the adapter 50 without using an expensive guide pin.

In the present embodiment, the optical fiber 20 is fixed to the first fiber groove portion 41 by the adhesive A. As a result, the position of the optical fiber 20 with respect to the lens 31c is fixed by the adhesive A, and thus the positioning of the optical fiber 20 with respect to the lens 31c can be performed more reliably.

In the present embodiment, the lid portion B disposed above the first fiber groove portion 41 via the optical fiber 20 is provided inside the window portion 34a. By the lid portion B pressing the optical fiber 20 against the first fiber groove portion 41, the optical fiber 20 can be positioned with respect to the lens 31c more reliably.

The present disclosure is not limited to the embodiment described above and can be modified as appropriate without departing from the scope of the claims.

Figure 13:
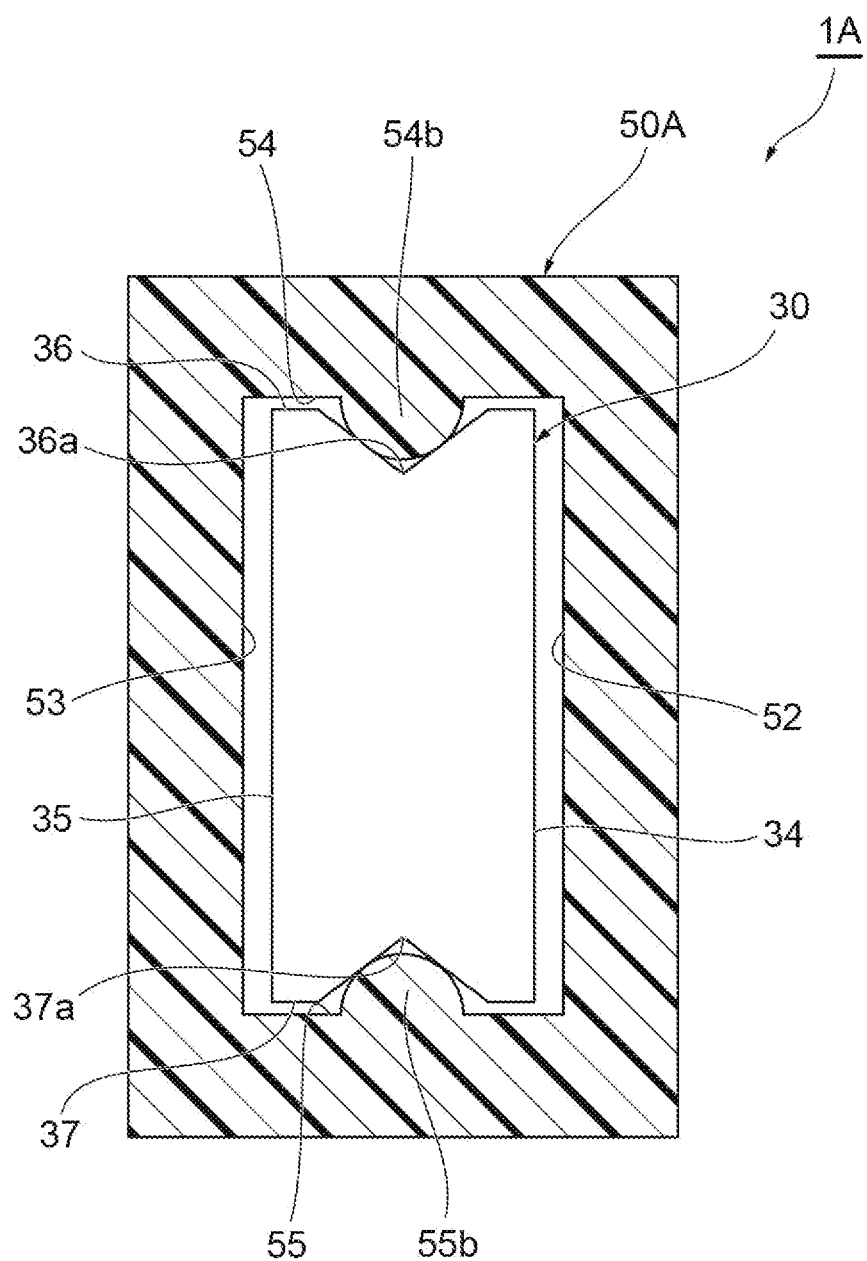
FIG. 13 is a rear view illustrating a modification example of an adapter of the optical connection structure.

FIG. 13 is a rear view illustrating a modification example of the optical connection structure 1 described above. FIG. 13 illustrates a cut surface with an adapter 50A cut along the YZ plane. In an optical connection structure 1A illustrated in FIG. 13, the adapter 50A is configured by a non-elastic material. Examples of the material of the adapter 50A include polyphenylene sulfide (PPS). The adapter 50A does not have the hollow portion 61 described above. In this case, elastic deformation of the adapter 50A is unlikely to occur even if a particularly hard material is not used as the material of the adapter 50A.

As illustrated in FIG. 13, the inner surface 54 and the inner surface 55 of the adapter 50A are provided with a semicircular protrusion 54b and a semicircular protrusion 55b instead of the V-protrusion 54a and the V-protrusion 55a, respectively. Each of the semicircular protrusion 54b and the semicircular protrusion 55b is a protrusion that is semicircular in the YZ cross section. The semicircular protrusion 54b and the semicircular protrusion 55b abut against the V-groove 36a and the V-groove 37a of the ferrule 30, respectively. The separation distance between the semicircular protrusion 54b and the semicircular protrusion 55b in the Y direction is slightly larger than the width between the V-groove 36a and the V-groove 37a of the ferrule 30 in the Y direction. The separation distance between the semicircular protrusion 54b and the semicircular protrusion 55b can be defined as the Y-direction distance between the top portion of the semicircular protrusion 54b and the top portion of the semicircular protrusion 55b with the ferrule 30 not inserted in the adapter 50A. A slight gap is formed between the semicircular protrusion 54b and the V-groove 36a in the Y direction, and a slight gap is formed between the semicircular protrusion 55b and the V-groove 37a in the Y direction.

Figure 14:
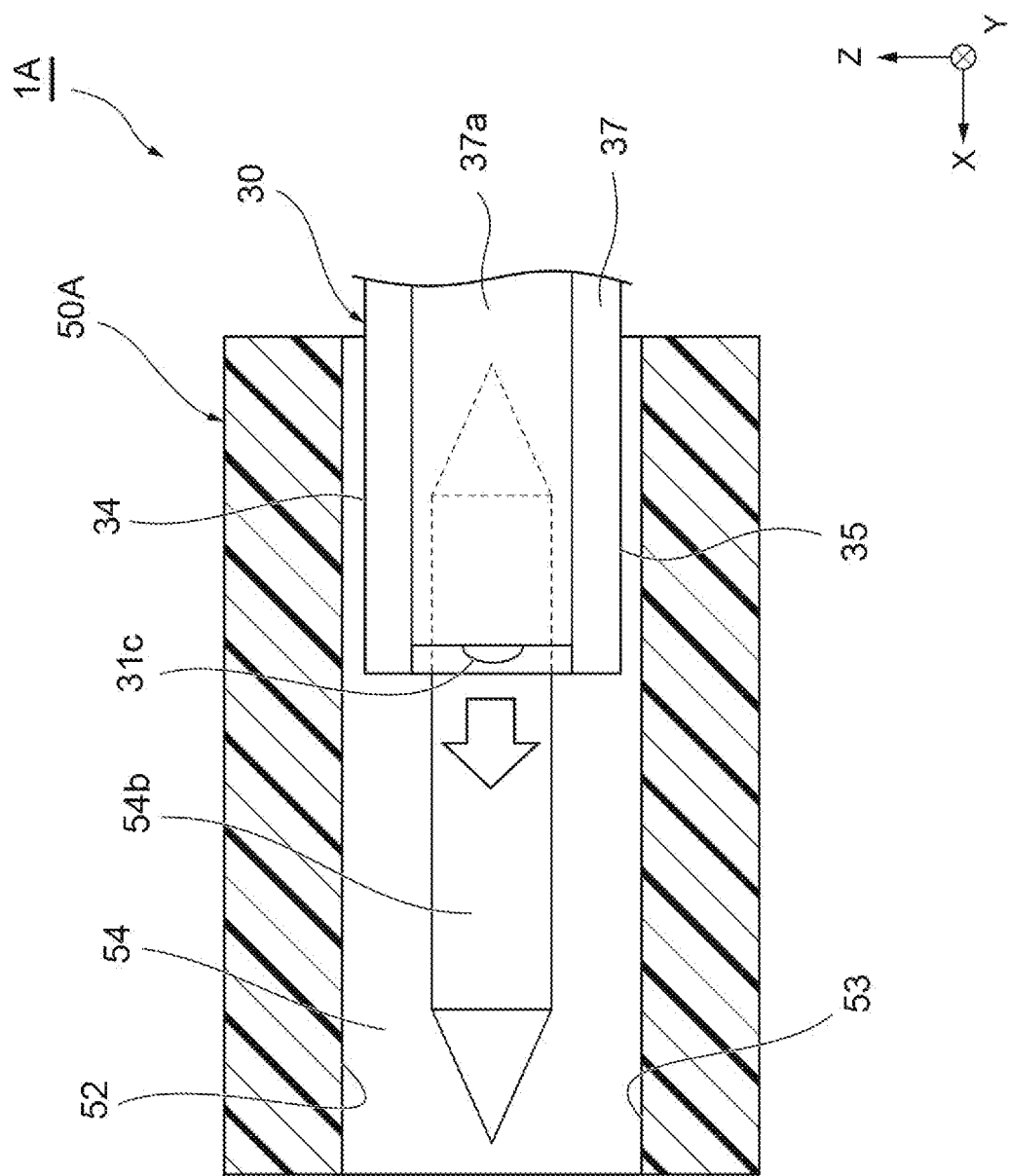
FIG. 14 is a diagram illustrating how the optical connector is inserted into the adapter of FIG. 13.

FIG. 14 is a side view illustrating the optical connection structure 1A. FIG. 14 illustrates a cut surface with the adapter 50A cut along the XZ plane. As illustrated in FIG. 14, both end portions of the semicircular protrusion 54b in the X direction are formed so as to be tapered as the distance therebetween increases in the X direction. In inserting and fitting the ferrule 30 into the adapter 50A, the ferrule 30 is moved along the X direction from one X-direction end to the other X-direction end of the adapter 50A in the adapter 50A. At this time, the semicircular protrusion 54b enters and abuts against the V-groove 36a (see FIG. 13) of the ferrule 30 and the semicircular protrusion 55b (see FIG. 13) enters and abuts against the V-groove 37a of the ferrule 30. As a result, the ferrule 30 is held by the semicircular protrusions 54b and 55b of the adapter 50A and the position of the ferrule 30 with respect to the adapter 50A is defined.

Therefore, the optical connection structure 1A according to this modification example is identical in action and effect to the optical connection structure 1 according to the embodiment described above. In a case where the adapter 50A is configured by a material that is not deformed elastically as in this modification example, if the V-groove 36a and the V-groove 37a are configured to be respectively fitted to the V-protrusion 54a and the V-protrusion 55a as in the embodiment described above, the effect of manufacturing tolerance or the like is likely to result in gaps between the V-groove 36a and the V-protrusion 54a in the Y direction and between the V-groove 37a and the V-protrusion 55a in the Y direction. In this case, it is assumed that the position of the ferrule 30 with respect to the adapter 50A is greatly misaligned in accordance with the contact positions of the V-grooves 36a and 37a with the V-protrusions 54a and 55a. In contrast, by configuring the V-groove 36a and the V-groove 37a to be respectively fitted to the semicircular protrusion 54b and the semicircular protrusion 55b, it is possible to suppress the occurrence of such positional misalignment of the ferrule 30 with respect to the adapter 50A.

The ferrule and the optical connector of the present disclosure are not limited to the embodiment and modification examples described above, and various other modifications are possible. For example, the configuration of the ferrule can be changed as appropriate in the embodiment and modification examples described above. For example, the ferrule may be configured separately from the lens portion although the embodiment described above exemplifies a case where the ferrule is configured integrally with the lens portion. In this case, the ferrule may be configured by a material other than light-transmitting resin.

REFERENCE SIGNS LIST 1, 1A: optical connection structure, 10: optical connector, 20: optical fiber, 30: ferrule, 31: lens portion, 31a: front end surface, 31b: rear end surface, 31c: lens, 32: front end surface (tip surface), 33: rear end surface, 33a: opening portion, 34: outside surface (upper surface), 35: outside surface, 36, 37: outside surface (side surface), 34a: window portion, 34b: window portion, 36a, 37a: V-groove (guide portion), 39: accommodation hole, 40: fiber groove, 41: first fiber groove portion, 42: second fiber groove portion, 41a: tapered portion (second tapered portion), 41c: tapered portion (first tapered portion), 42b: tapered portion, 41b, 42a: straight portion, 50, 50A: adapter, 51: insertion hole, 52, 53, 54, 55: inner surface, 54a, 55a: V-protrusion, 54b, 55b: semicircular protrusion, 54W: wall portion, 61: hollow portion, A: adhesive, B: lid portion, C0: center, C1, C2, C3: virtual circle, D1, D2, D3: depth, d1, d2, d3: diameter, L1, L2: total length, R: distance, S1, S2, S3: inner surface, W1, W2: opening width.

The invention claimed is:

1. A ferrule comprising:
a tip surface;
an opening portion provided on a side opposite to the tip surface in a first direction intersecting the tip surface;
a plurality of fiber grooves extending along the first direction and arranged along a second direction intersecting the first direction between the tip surface and the opening portion, the plurality of fiber grooves being capable of respectively supporting a plurality of optical fibers; and a plurality of lenses respectively disposed on extension lines of the plurality of fiber grooves, wherein:

the fiber groove has a first fiber groove portion for positioning the optical fiber with respect to the lens and a second fiber groove portion for introducing the optical fiber into the first fiber groove portion, the first fiber groove portion is disposed closer to the lens than the second fiber groove portion in the first direction, and the first fiber groove portion includes:

a straight portion where a diameter of a virtual circle centered on an optical axis of the lens and inscribed in the first fiber groove portion is constant at each position along the first direction;

a first tapered portion disposed between the straight portion and the second fiber groove portion in the first direction and inclined such that the diameter of the virtual circle centered on the optical axis of the lens and inscribed in the first fiber groove portion increases as a distance from the straight portion increases; and a second tapered portion disposed between the lens and the straight portion in the first direction and inclined such that the diameter of the virtual circle centered on the optical axis of the lens and inscribed in the first fiber groove portion increases as a distance from the straight portion increases.

2. The ferrule according to claim 1, wherein each of the first fiber groove portion and the second fiber groove portion is V-shaped in a cross section perpendicular to the first direction.

3. The ferrule according to claim 1, wherein an opening width of the second fiber groove portion is larger than an opening width of the first fiber groove portion in a cross section perpendicular to the first direction.

4. The ferrule according to claim 1, wherein a depth of the second fiber groove portion is deeper than a depth of the first fiber groove portion in a cross section perpendicular to the first direction.

5. The ferrule according to claim 1, wherein a diameter of a virtual circle centered on the optical axis of the lens and inscribed in the second fiber groove portion is larger than the diameter of the virtual circle centered on the optical axis of the lens and inscribed in the first fiber groove portion in a cross section perpendicular to the first direction.

6. The ferrule according to claim 5, wherein the second fiber groove portion includes:

a straight portion where the diameter of the virtual circle centered on the optical axis of the lens and inscribed in the second fiber groove portion is constant at each position along the first direction; and a tapered portion disposed on a side opposite to the first fiber groove portion with respect to the straight portion in the first direction and inclined such that the diameter of the virtual circle centered on the optical axis of the lens and inscribed in the second fiber groove portion increases as a distance from the straight portion increases.

7. The ferrule according to claim 1, wherein a total length of the second fiber groove portion in the first direction is equal to or greater than a total length of the first fiber groove portion in the first direction.

8. The ferrule according to claim 1, wherein the second fiber groove portion is disposed at a predetermined interval from the first fiber groove portion in the first direction.

9. The ferrule according to claim 1, further comprising an upper surface disposed at a position facing the plurality of fiber grooves in a third direction intersecting the first direction and the second direction, wherein the upper surface has a window portion opening in a region facing the first fiber groove portion in the third direction, and the first fiber groove portion is fitted inside the window portion when viewed from the third direction.

10. The ferrule according to claim 9, wherein a total length of the first fiber groove portion in the first direction is shorter than a width of the window portion in the first direction, and a total width of all the first fiber groove portions in the second direction is smaller than a width of the window portion in the second direction.

11. The ferrule according to claim 1, further comprising a pair of side surfaces disposed at positions facing each other with the plurality of fiber grooves interposed therebetween in the second direction, wherein the pair of side surfaces are respectively provided with guide portions guiding insertion into an adapter along the first direction.

12. The ferrule according to claim 1, wherein the ferrule is configured integrally with the lens.

13. An optical connector comprising:

the ferrule according to claim 1; and the plurality of optical fibers respectively supported by the plurality of fiber grooves and respectively disposed on optical axes of the plurality of lenses.

14. The optical connector according to claim 13, wherein the optical fiber is fixed to the first fiber groove portion by an adhesive.

15. The optical connector according to claim 14, wherein the ferrule includes an upper surface disposed at a position facing the plurality of fiber grooves in a third direction intersecting the first direction and the second direction, the upper surface has a window portion opening in a region facing the first fiber groove portion in the third direction, and a lid portion disposed above the first fiber groove portion via the optical fiber is provided inside the window portion.

16. The optical connector according to claim 15, wherein the first fiber groove portion includes a straight portion where a diameter of a virtual circle centered on the optical axis of the lens and inscribed in the first fiber groove portion is constant at each position along the first direction, and the lid portion is disposed in a region in the window portion facing the straight portion in the third direction.

17. The optical connector according to claim 15, wherein the lid portion is a plate-shaped member configured separately from the ferrule and is disposed so as to come into contact with the plurality of optical fibers respectively supported by the plurality of fiber grooves.

18. The optical connector according to claim 13, wherein a total length of the first fiber groove portion in the first direction is set to a range of 3 times or more to 40 times or less a diameter of the optical fiber.

* * * * *